(12) United States Patent
Graham

(10) Patent No.: US 7,318,627 B2
(45) Date of Patent: Jan. 15, 2008

(54) RECOVERY HEAD WITH TRACK SEAL

(75) Inventor: Neil Deryck Bray Graham, Cockburn Waters (AU)

(73) Assignee: SORD Technologies Limted, Perth (AU)

( * ) Notice: Subject to any disclaimer, the term of this patent is extended or adjusted under 35 U.S.C. 154(b) by 0 days.

(21) Appl. No.: 11/110,324

(22) Filed: Apr. 20, 2005

(65) Prior Publication Data

US 2005/0179307 A1    Aug. 18, 2005

Related U.S. Application Data

(62) Division of application No. 10/240,880, filed as application No. PCT/AU01/00386 on Apr. 5, 2001, now Pat. No. 6,953,307.

(30) Foreign Application Priority Data

| Apr. 5, 2000 | (AU) | .................................... PQ6744 |
| Apr. 5, 2000 | (AU) | .................................... PQ6745 |
| Nov. 23, 2000 | (AU) | .................................... PR1624 |

(51) Int. Cl.
*E21C 50/00* (2006.01)

(52) U.S. Cl. ......................................................... 299/9
(58) Field of Classification Search .................... 299/9; 305/100, 105, 110, 108, 107
See application file for complete search history.

(56) References Cited

U.S. PATENT DOCUMENTS

| 2,597,101 | A | * | 5/1952 | Jasper ........................ 280/28.5 |
| 2,982,584 | A | * | 5/1961 | Uemura ........................ 305/107 |
| 3,927,164 | A | | 12/1975 | Shimabukuro |
| 4,116,496 | A | * | 9/1978 | Scott ........................... 305/108 |
| 4,713,896 | A | * | 12/1987 | Jennens ........................ 37/309 |
| 4,901,804 | A | | 2/1990 | Thometz |
| 5,803,666 | A | | 9/1998 | Keller |
| 6,044,921 | A | * | 4/2000 | Lansberry .................. 180/9.36 |
| 6,283,209 | B1 | | 9/2001 | Keller |
| 6,619,886 | B1 | | 9/2003 | Harrington |

FOREIGN PATENT DOCUMENTS

| EP | 0 098 547 A1 | 1/1984 |
| EP | 0 921 237 A2 | 12/1998 |

(Continued)

OTHER PUBLICATIONS

International Search Report PCT/AU01/00386.

*Primary Examiner*—John Kreck
(74) *Attorney, Agent, or Firm*—Hogan & Hartson LLP

(57) ABSTRACT

An apparatus for assembling a liner from a plurality of longitudinal sections of flexible material having longitudinal edges adapted to be joined one to another to form the liner includes a path means along which the longitudinal sections of flexible material can be conveyed in a laterally reduced condition, an assembly zone at which the longitudinal edges can be joined together to form the liner, and a guide structure about which the flexible material can turn upon exiting from the path means to provide an inner section and an outer section turned back with respect to the inner section. The guide structure presents a guide, surface over which the longitudinal sections of flexible material can pass, the surface being configured to facilitate spreading of each longitudinal section from the laterally reduced condition.

18 Claims, 38 Drawing Sheets

FOREIGN PATENT DOCUMENTS

| | | |
|---|---|---|
| EP | 0 692 580 B1 | 3/2000 |
| EP | 1 036 916 A1 | 9/2000 |
| JP | 08002451 A * | 1/1996 |
| JP | 10034750 A | 2/1998 |
| JP | 10100255 A | 4/1998 |
| JP | 10180872 A | 7/1998 |
| JP | 2000104279 A | 4/2000 |
| JP | 2000186339 A | 7/2000 |
| WO | WO 92/15817 A1 | 9/1992 |
| WO | WO 95/15460 A1 | 6/1995 |
| WO | WO 96/11324 * | 4/1996 |
| WO | WO 96/26794 * | 9/1996 |
| WO | WO 98/34742 A1 | 8/1998 |
| WO | WO 99/10622 A1 | 3/1999 |

* cited by examiner

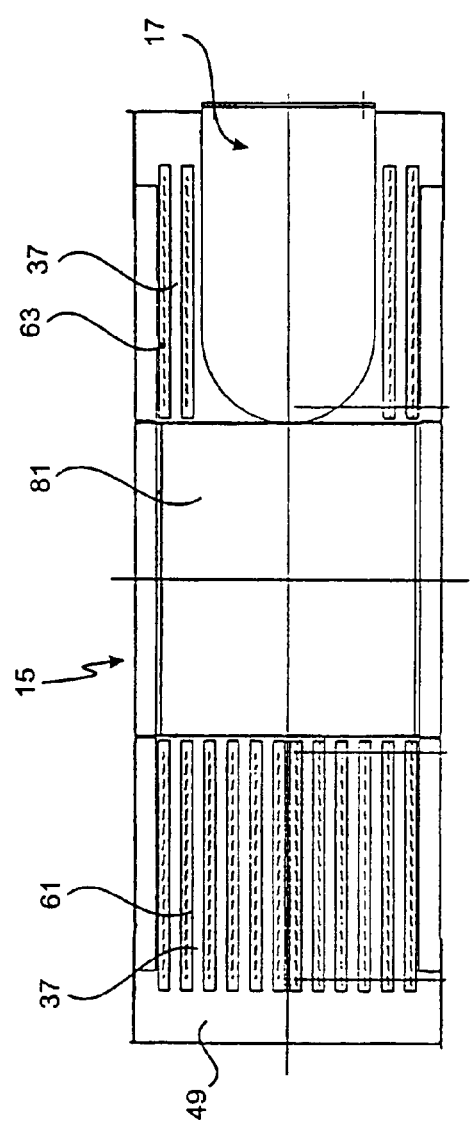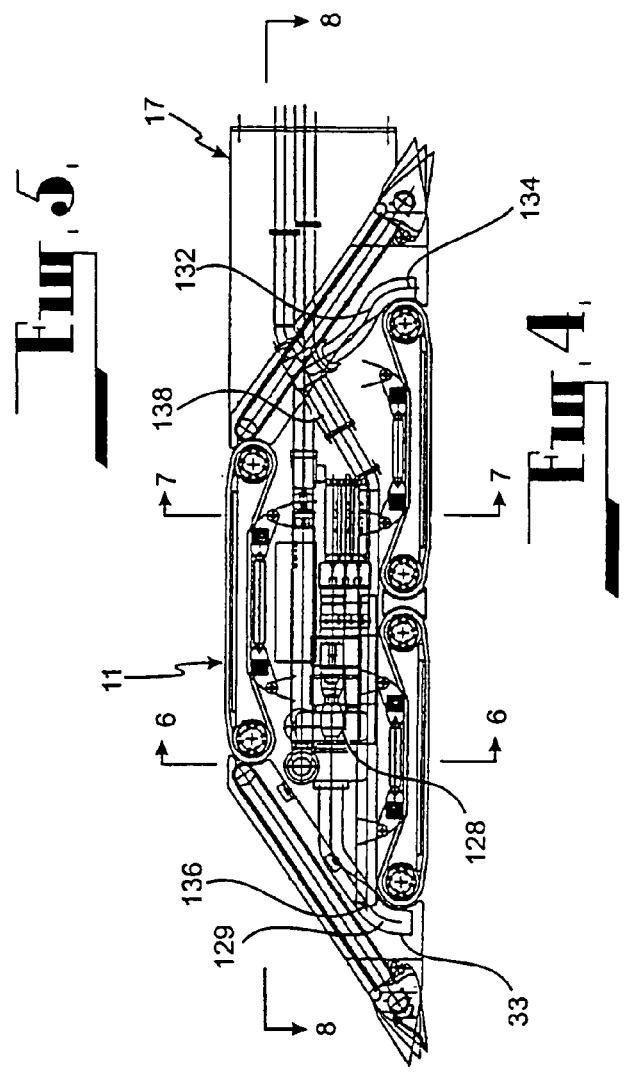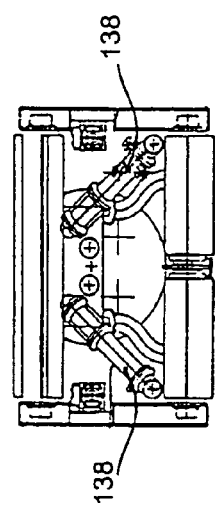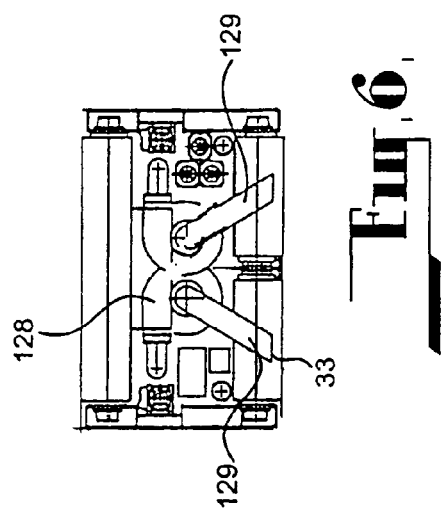

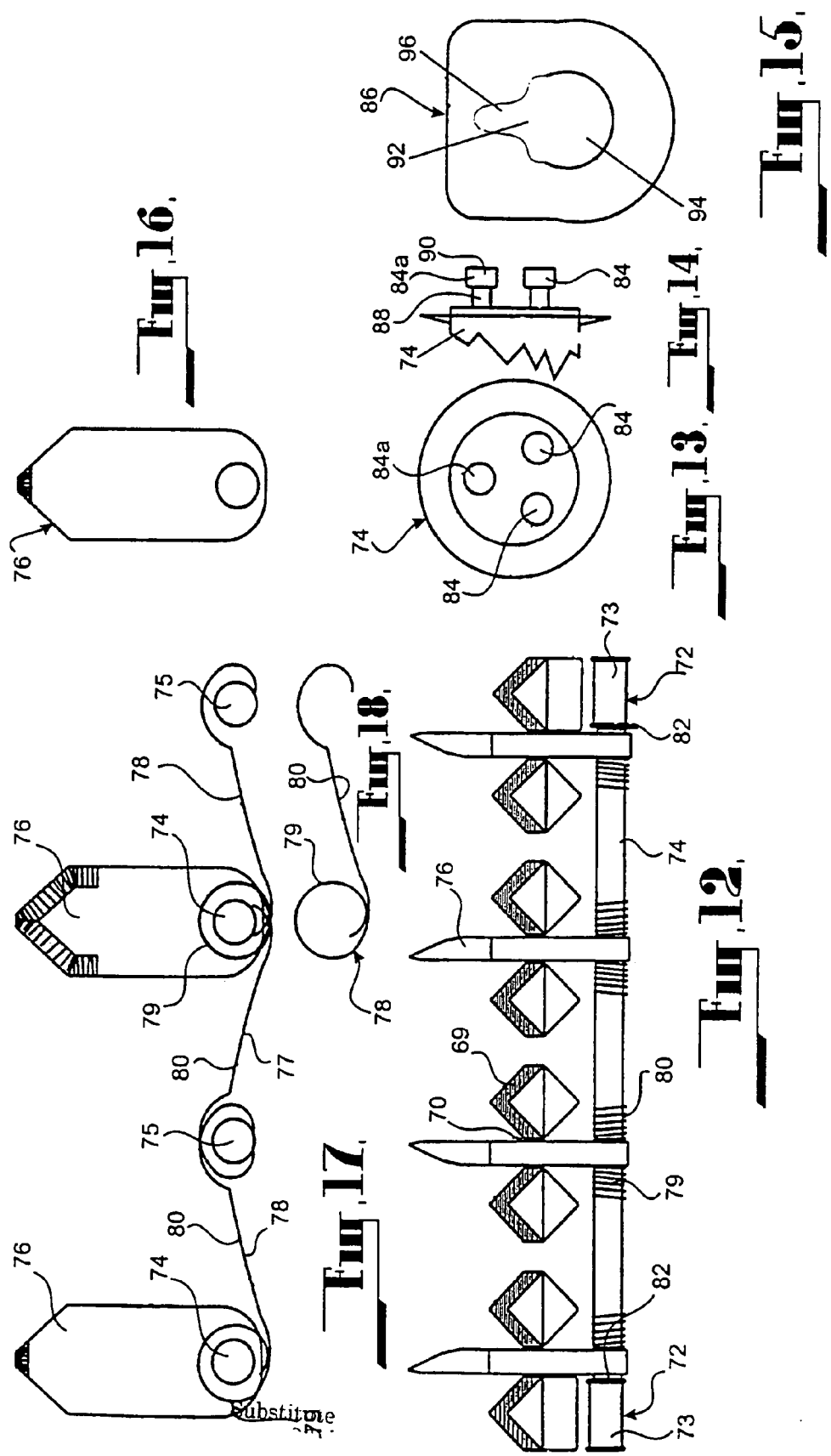

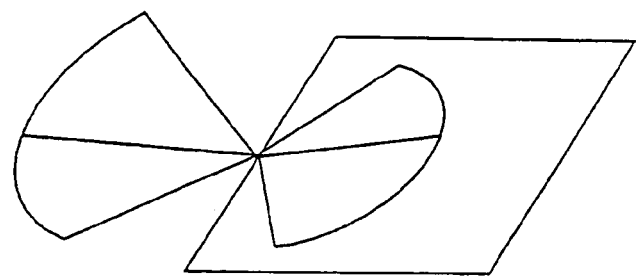
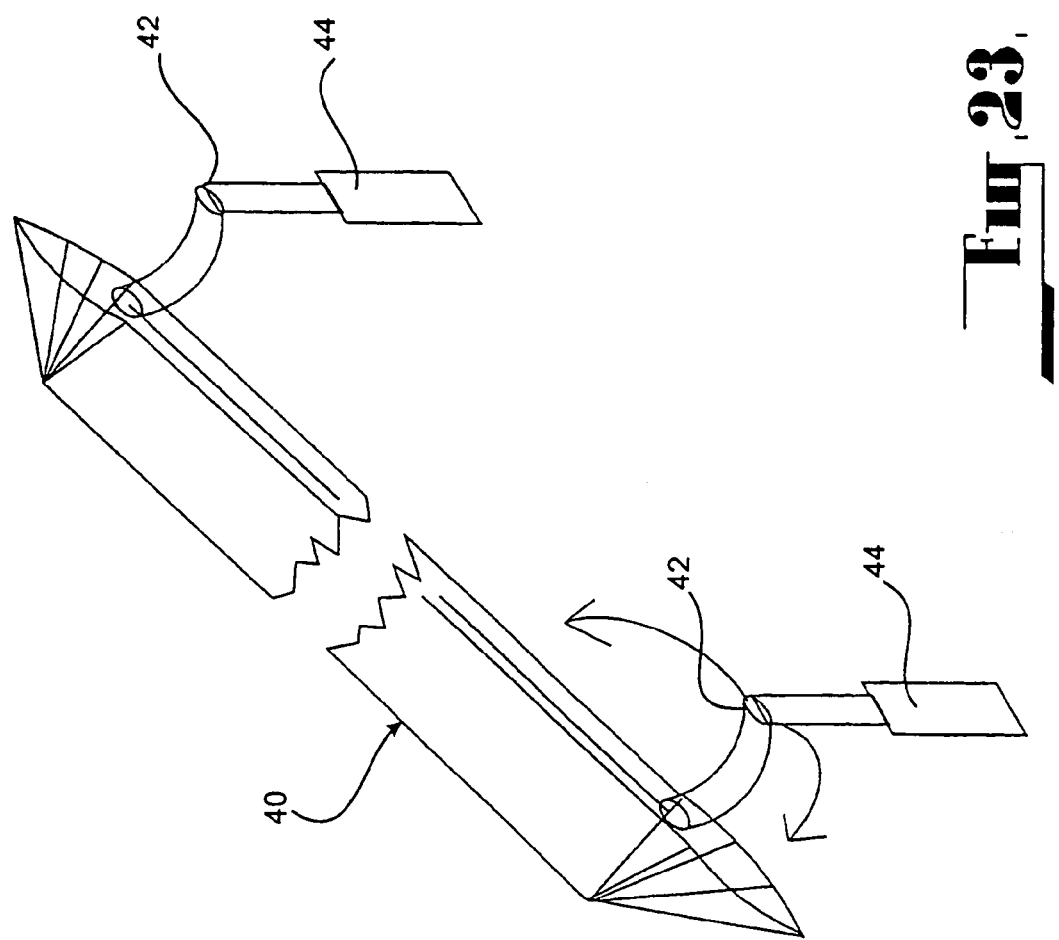
Fig. 23

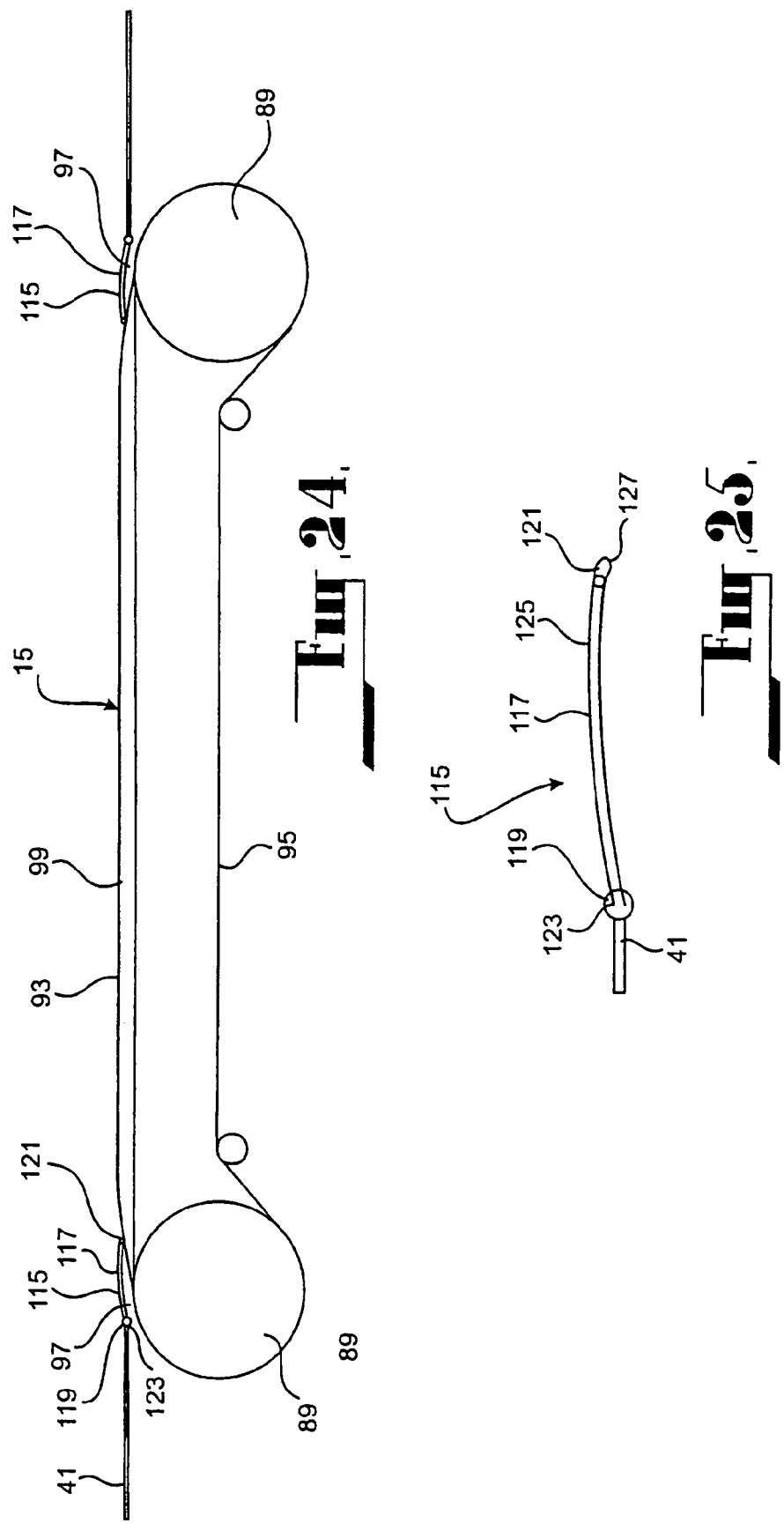

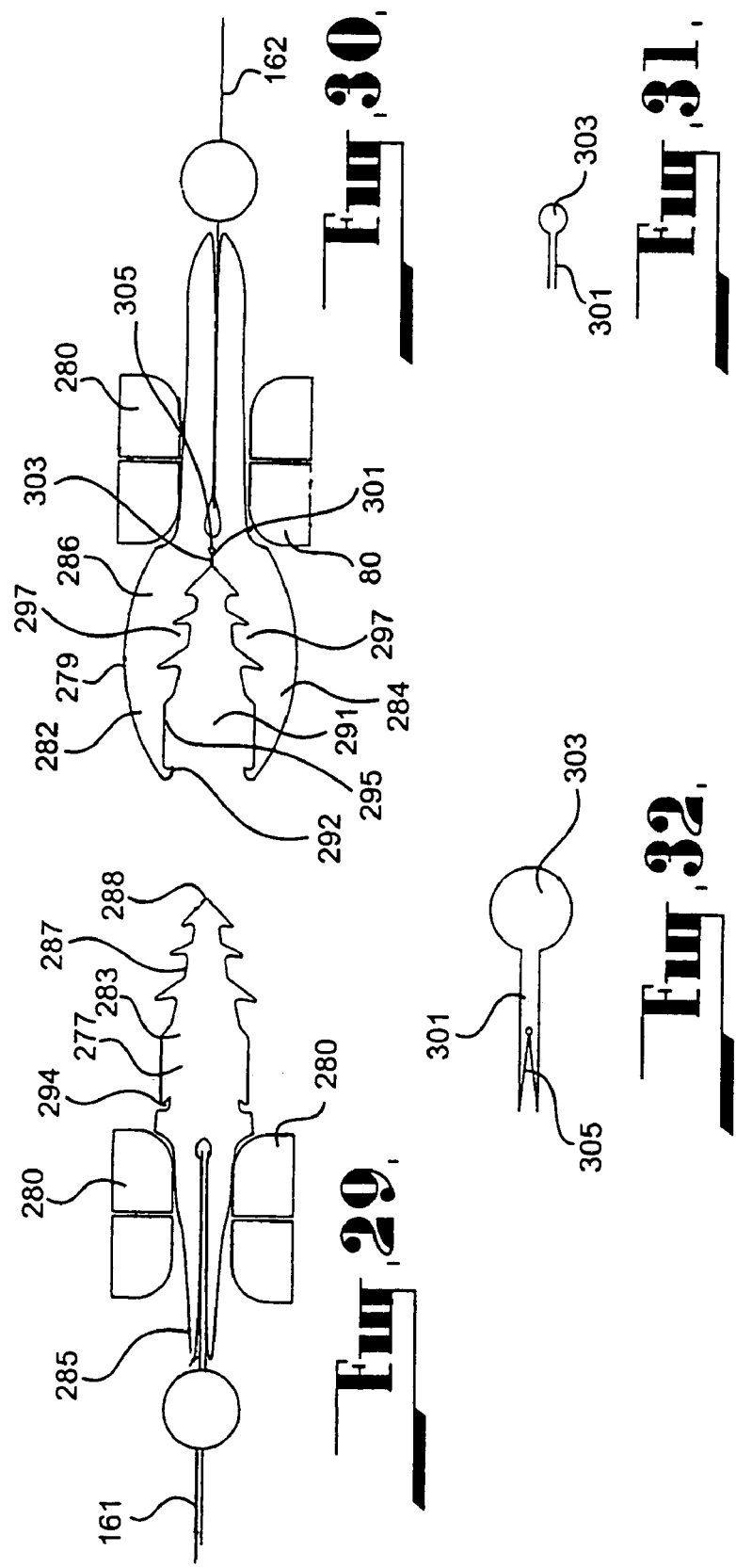

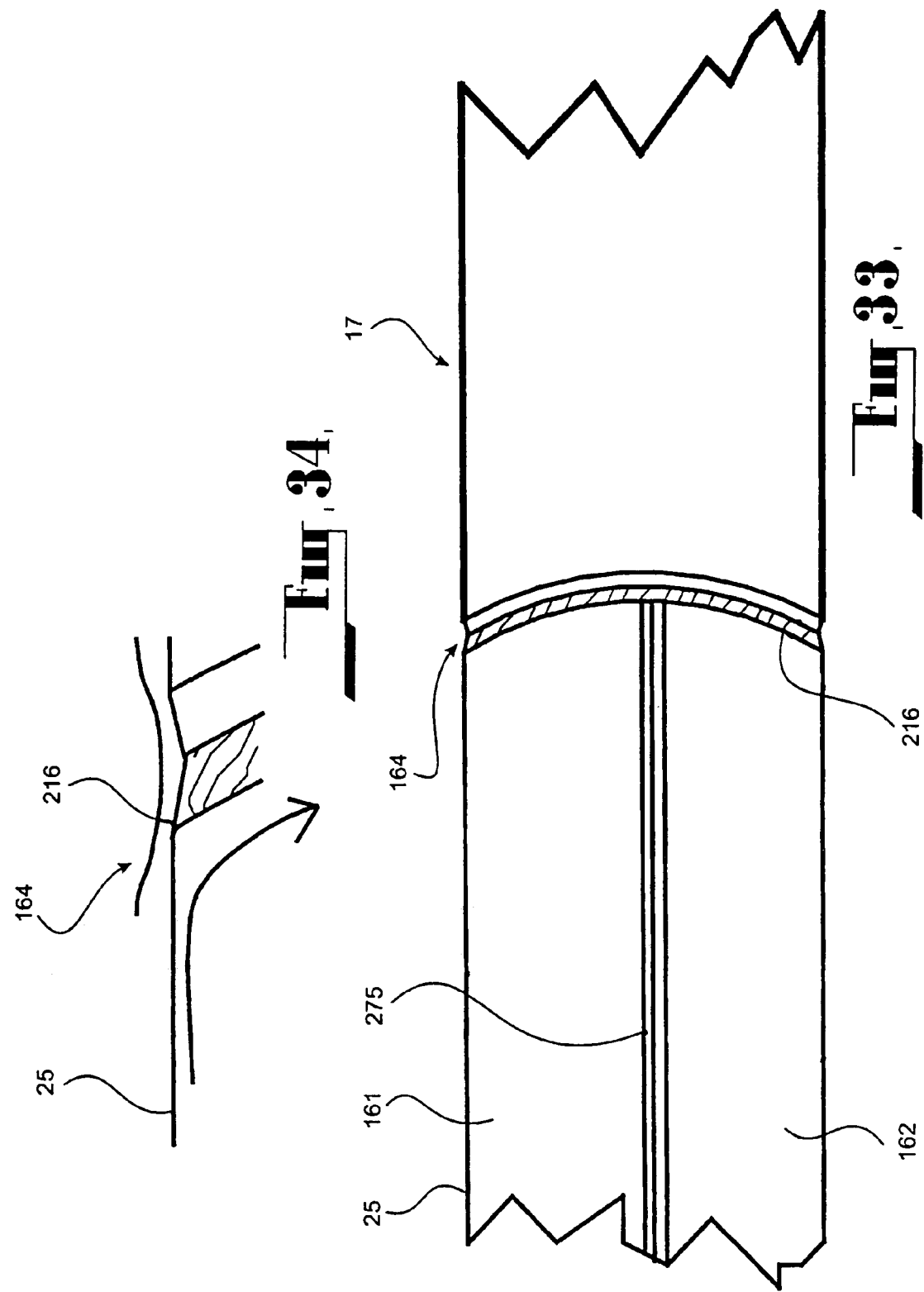

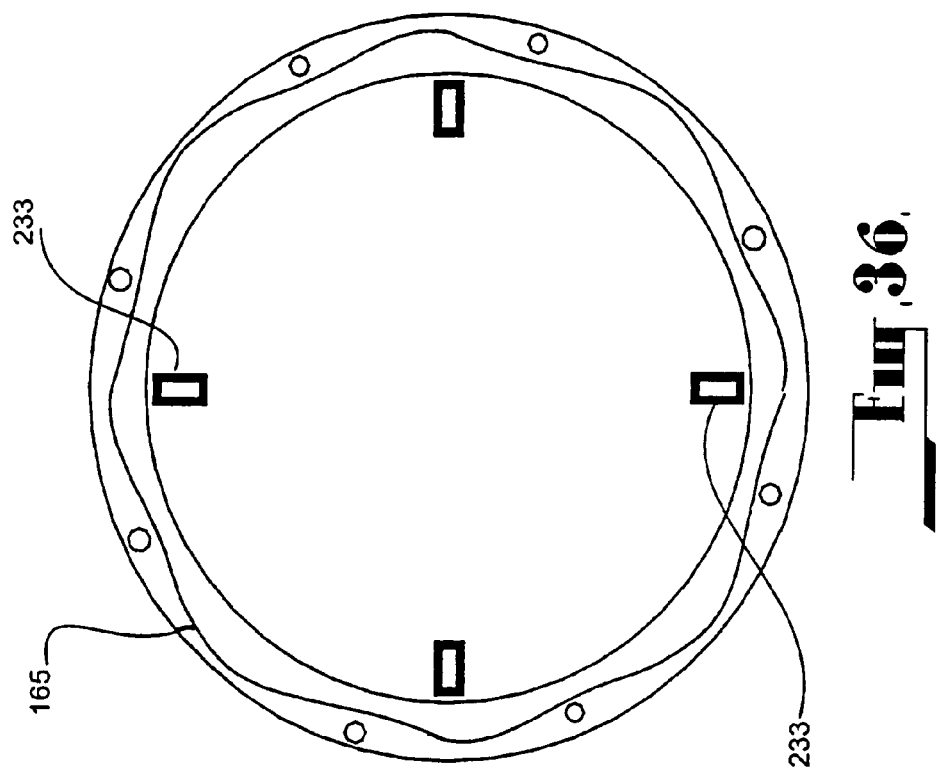
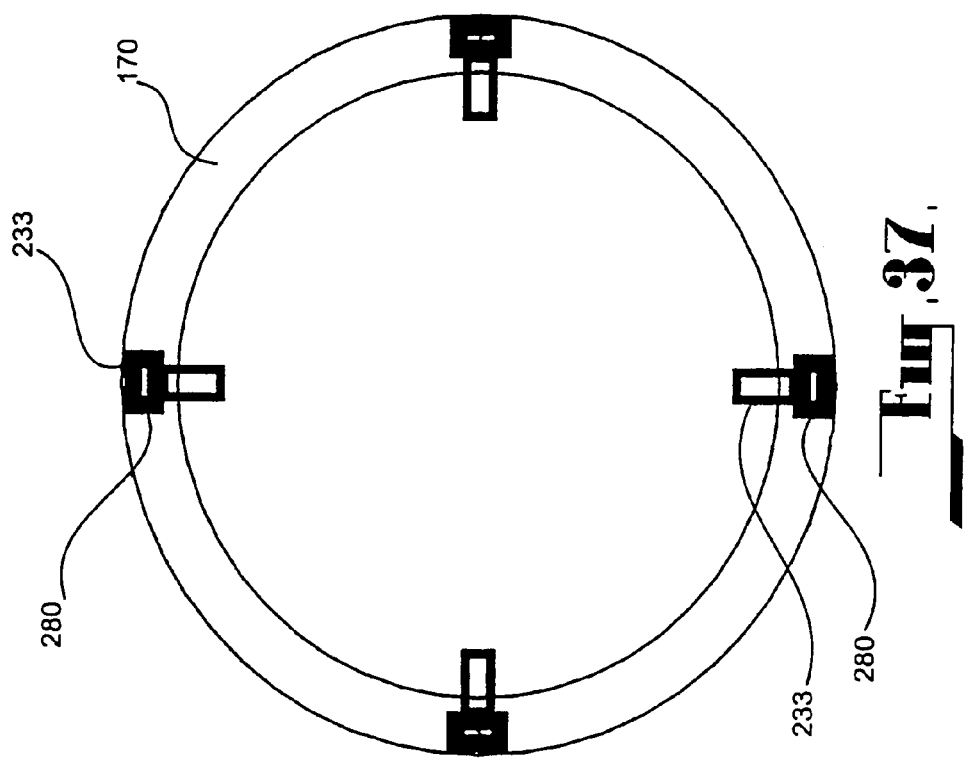

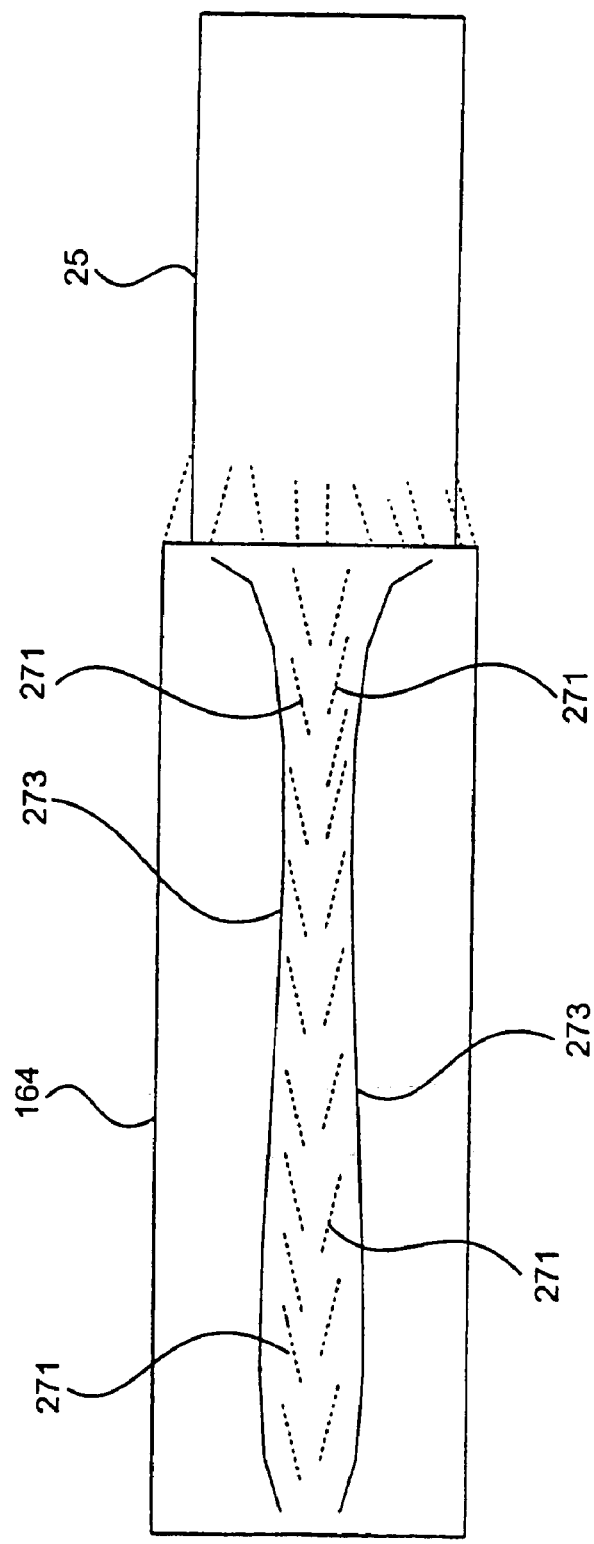

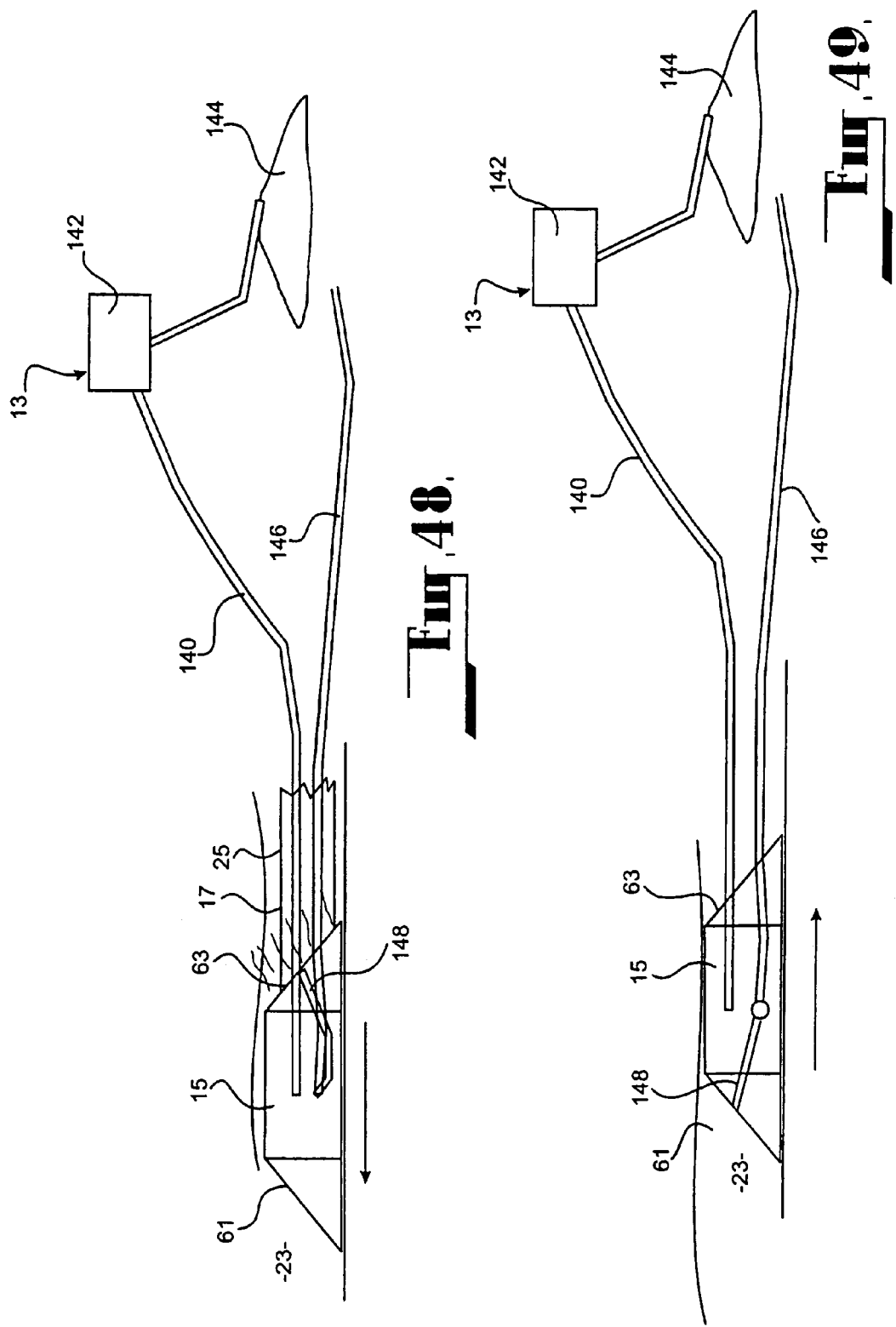

RECOVERY HEAD WITH TRACK SEAL

CROSS-REFERENCE TO RELATED APPLICATIONS

The present application is a divisional of U.S. patent application Ser. No. 10/240,880 filed Jan. 30, 2003, now U.S. Pat. No. 6,953,307 which claims priority of PCT/AU01/00386 filed Apr. 5, 2001, which claims priority of Australia Patent Applications Nos. PQ 6744 and PQ 6745 filed Apr. 5, 2000 and of Australia Patent Application No. PR 1624 filed Nov. 23, 2000, the disclosures of all applications being incorporated herein in their entireties by this reference.

BACKGROUND OF THE INVENTION

1. Field of the Invention

This invention relates to apparatus for assembling a liner for lining a passage. The passage may comprise a duct such as for example a pipeline, or an underground passage such as for example a tunnel.

The liner may be assembled in a pre-existing passage or it may be assembled during construction or formation of a passage. The liner may be for any appropriate purpose, such as for example to seal a passage against ingress or egress of fluid through the side wall thereof, or to provide internal support to a passage.

2. Background Art

A particular application of the apparatus is in the recovery of material from the ground (including the floor of bodies of water) and in particular from underground locations.

The invention has been devised specifically, although not solely, for underground mining operations including in particular mining operations in continuously collapsing sand environments. In such an application, the invention is concerned with improvements to apparatus disclosed in International Application Nos. PCT/AU96/00106 and PCT/AU95/00667 in the name of Neil Deryck Bray Graham, the contents of which are incorporated herein by way of reference.

In International Application No. PCT/AU96/00106 there is disclosed a system for recovery of materials from underground locations. Specifically, there is disclosed apparatus for recovering material from an underground location, comprising a recovery head for receiving material to be recovered and a conveying means for conveying the material from the recovery head to a remote location. The recovery head comprises a chamber for receiving material to be recovered and a screen associated with the chamber for screening material entering the chamber. The screen has a first side from which material being screened passes therethrough. The screen has a plurality of elongate screen openings which extend from the first side of the screen to a second side. A plurality of tines are mounted on a support means disposed on the second side of the screen, with each tine being movable along a path at least part of which includes one of the elongate screen openings, whereby the tine is received in and movable along the elongate screen opening, with the tine extended beyond the first side of the screen for at least part of the movement thereof along the screen.

Typically, the conveying means comprises a pipe string and the recovery head is positioned at the lower end of the pipe string. A structure for operating the pipe string is provided at a receiving and handling station situated at ground level. The recovery head is delivered to the underground location at which a mining operation is to be performed and also moves through that location by progressively excavating material to create a passage for itself and the pipe string trailing behind it. The difficulty with this arrangement is that the passage excavated by the recovery head can collapse about the pipe string, particularly in circumstances where the surrounding material is unstable, such as in soft sandy conditions.

International Application No. PCT/AU95/00667 discloses an arrangement for progressively installing a lining within the passage created by the recovery head as the passage is formed. The lining comprises a casing defined by a shroud provided about the pipe string to line the passage so as to prevent the surrounding material from collapsing onto the pipe string. The shroud is formed from flexible material delivered in two longitudinal sections and then assembled to form the shroud around the pipe string. Each longitudinal section of flexible material is stored in roll form at a station situated at ground level and is unwound from the roll as the pipes string advances. This arrangement allows the shroud to be deployed over long distances.

As disclosed in International Application No. PCT/AU95/00667, the shroud formed from flexible material is assembled around the pipe string behind the recovery head for lining the passage created by the recovery head so as to prevent material in the surrounding environment from collapsing onto the pipe string. The shroud is assembled from flexible material delivered in two longitudinal sections. The pipe string has a head end section which is provided with two rollers one corresponding to each longitudinal section of the flexible material. Each section of flexible material is delivered to its respective roller in a compact condition and turns about the respective roller to provide an inner section and an outer section. The outer sections spread from the compact condition and are subsequently brought together to form the shroud.

The rollers are accommodated in a casing which surrounds the head end section. Because of their nature, the rollers form protuberances in the casing. Unfortunately, the protuberances have a detrimental influence in that their presence imparts a significant amount of drag on the overall assembly.

The quest for a solution to this problem has led to the present invention.

SUMMARY OF THE INVENTION

Accordingly, according to a first aspect the present invention provides apparatus for assembling a liner from a plurality of longitudinal sections of flexible material having longitudinal edges adapted to be joined one to another to form the liner, the apparatus comprising a path means along which the longitudinal sections of flexible material can be conveyed in a laterally reduced condition, means defining an assembly zone at which the longitudinal edges can be joined together to form the liner, and a guide structure about which the flexible material can turn upon exiting from the path means to provide an inner section and an outer section turned back with respect to the inner section, the guide structure presenting a guide surface over which the longitudinal sections of flexible material can pass, the surface being configured to facilitate spreading of each longitudinal section from the laterally reduced condition.

In one arrangement, the longitudinal edges may be joined together prior to contact with the guide surface. In another arrangement, the longitudinal edges may be joined together after contact with the guide surface.

Preferably, each longitudinal section of flexible material spreads from the laterally reduced condition in a manner which precludes formation of irregularities such as wrinkles, creases and folds in the assembled liner.

The guide surface may extend between first and second boundaries with at least one of the boundaries being arcuate, characterised in that the two boundaries are of substantially equal length.

The equality of length of the two boundaries may be achieved by one of the boundaries being of sinusoidal profile and the guide surface having a further sinusoidal profile between the two boundaries, the two sinusoidal profiles being out of phase such that the troughs on each profile are aligned with the crests on the other profile in the direction of movement of the longitudinal sections of flexible material over the guide surface.

The guide surface may be in the form of a guide ring having an outer circumference defining one of the boundaries and an inner circumference defining the other boundary. In such an arrangement, the inner circumference is the boundary which is of sinusoidal profile. Additionally, the further sinusoidal profile is provided at one axial end of the ring.

In certain applications it may be advantageous to be able to withdraw the assembled liner from within the passage. One such application is in a system disclosed in International Application PCT/AU96/00106 where the recovery head and pipe string can be retracted along the passage formed by the recovery head. During retraction of the pipe string and the recovery head, the liner which provides the shroud can be dissembled and the longitudinal sections of flexible material retracted and returned to a stored form. During the retraction process, the longitudinal sections of flexible material may be cleaned. The cleaning process may be performed most advantageously by the removal of wrinkles as the material is stretched around the guide structure and by spraying a cleaning fluid (such as for example water or air or a combination thereof onto the sections of flexible material. This process is designed to remove the final vestige of sand and other particles from the flexible material as it goes around the guide structure and prior to its retracted return to surface by the elongate structure. The cleaning fluid may be sprayed in a fashion which creates a spiralling flow against a surface of the longitudinal section of flexible material being cleaned. The spiral flow is particularly effective in dislodging sand which might otherwise accumulate against the surface.

As disclosed in International Application PCT/AU95/00667, the longitudinal sections of flexible material which are assembled to form a liner which provides the shroud, are joined one to another at adjacent longitudinal edges with a connector assembly comprising a first connector element in the form of a male element and a second connector element in the form of a female element. The arrangement is such that the male connector element of each longitudinal section of flexible material is arranged for engagement with the female connector element of the other longitudinal section of flexible material in the manner of a zipper. In this way, the longitudinal edges of the two longitudinal sections of flexible material are progressively brought towards each other and then subsequently zipped together.

Where the longitudinal edges of the liner are adapted to be zipped together, the means defining an assembly zone may comprise a zipper slider.

The connector assembly may comprise first and second elongate connector elements of complementary configuration, said first connector element being adapted for attachment to one of the longitudinal sections and having two jaw sections defining an opening in opposed relation to said one longitudinal section and a channel portion having a pair of opposed sides in spaced apart relationship and extending inwardly from said opening to define a locking cavity, the opposed sides having opposed inner faces confronting the locking cavity, containing a first engaging means and converging towards the other of the opposed sides in a direction away from the opening, said second connector element being adapted for attachment to another longitudinal section and including a head portion adapted to be received in the locking cavity of the channel portion of the first connector element, the head portion having opposed side faces converging towards each other in a direction away from said another longitudinal section, each face being provided with a second engaging means, the free end of each jaw section being adapted to pivotally engage with the head portion when the latter is received in the locking cavity the second engaging means engaging with the first engaging means when the head portion is received within the locking cavity and releasable secures the second connector element to the first connector element, whereby such may be progressively pressed together along the length thereof and force applied to pull such apart acts to strengthen the grip therebetween, with the connector elements requiring an unpeeling or unzipping action to separate same.

Preferably, a formation is provided adjacent the free end of each jaw section for engaging with a complementary formation on the head to provide said pivotal engagement between the jaw section and the head. The formation on the jaw section may comprise a tooth formation and the complementary formation on the head may comprise a recess to receive the tooth formation.

Typically, inter-engagement between each tooth formation and the corresponding tooth recess provides a pivot about which the respective jaw sections can pivot under the influence of a separating force applied to the connector elements so as to urge the jaw sections inwardly. This enhances the interlocking action.

The opposed sides of the channel portion may terminate at one end of a slit extending into the body in the direction away from the opening, a hinge being provided at the other end of the slot to facilitate movement of the two jaw sections towards and away from each other.

The slit may terminate at a hole.

As alluded to earlier, the apparatus according to the invention may be used in combination with a recovery head and a pipe string to assemble a shroud about the pipe string behind the recovery head for lining a passage created by the recovery head to prevent material in the surrounding environment from collapsing onto the pipe string.

The recovery head may comprise a chamber for receiving material to be recovered, a screen associated with the chamber for screening material entering the chamber, and a propulsion means for propelling the recovery head through a formation containing the material to be recovered, the propulsion means comprising an endless track having a first run which is exposed to the exterior of the recovery head for driving engagement with the environment through which the recovery head is to pass and a second run within the confines of the recovery head so as not to be exposed to that environment.

Preferably, the recovery head has a fore-and-aft axis and comprises a body including an exterior casing having a front wall defining a frontal surface in which the screen is accommodated, a rear wall, a top wall and a bottom wall defining a base.

The endless track may be associated with the top wall, with the first run travelling along the top wall in a direction parallel to the fore-and-aft axis of the recovery head. There may be two or more such endless tracks associated with the top wall.

The propulsion means may comprise a further endless track having an outer run exposed to the exterior of the recovery head for driving engagement with the environment through which the recovery head is to pass and an inner run within the confines of the recovery head so as not to be exposed to such environment, the further endless track being associated with the bottom wall, with the first run travelling along the bottom wall in a direction parallel to the fore-and-aft axis of the recovery head. There may be two or more such endless tracks associated with the bottom wall.

Each endless track may be provided with a gripping structure such as cleats for tractive engagement with the environment through which the recovery head is to pass.

The inner run of each endless track may be accommodated within the interior of the body of the recovery head, the body being provided with openings through which the endless track passes between the exterior and interior of the body.

Preferably, a sealing means is associated with each opening to inhibit ingress of sand and other unwanted material into the interior of the recovery head through the opening. The sealing means may comprise a seal flap having two opposed edges, the seal flap being hingedly mounted at one of said edges for pivotal movement and the other of said edges being adapted to sealingly contact the first run of the endless track, whereby pivotal movement of the seal flap can accommodate irregularities (such as a tread structure) on the outer face of the endless track.

Conveniently, the seal flap is disposed at a location inwardly of the outer face of the first run of the endless track so as not to impede operation of the track.

Preferably, the seal flap has an outer face which is configured to interact with oncoming material in the environment through which the recovery head passes, whereby such interaction biases the seal flap into sealing engagement with the endless track. One such suitable configuration is a convex formation.

Conveniently, a biasing means is also provided to bias the seal flap into sealing engagement with the endless track. The biasing means typically comprises a spring.

Preferably, a cleaning system is provided to clean sand and other unwanted material from the edge of the seal flap contacting the endless track, thereby maintaining the integrity of the seal. Typically, the cleaning system comprises water jets provided in the seal flap adjacent said edge.

The first run of the or each endless belt may travel along a support plate which provides support for the run against inward deflection thereof under loading applied by the surrounding environment. The support plate may be formed of low-friction material.

The support plate may also incorporate a series of spaced-apart pressure pads each utilising a flow of water under pressure to provide additional support for the first run of the track. Each pressure pad may be provided by a valve structure having the facility to regulate water pressure delivered to the endless track according to loading on the track at that location.

According to a further aspect of the invention there is provided a recovery head comprising a chamber for receiving material to be recovered, a screen associated with the chamber for screening material entering the chamber, and a propulsion means for propelling the recovery head through a formation containing the material to be recovered, the propulsion means comprising an endless track having a first run which is exposed to the exterior of the recovery head for driving engagement with the environment through which the recovery head is to pass and a second run within the confines of the recovery head so as not to be exposed to that environment.

According to a still further aspect of the invention there if provided a guide structure presenting a guide surface about which a length of flexible material can be turned, the guide structure presenting a guide surface extending between first and second boundaries with at least one of the boundaries being arcuate, characterised in that the two boundaries are substantially of equal length.

The guide surface may comprise a guide ring having an outer circumference defining one of the boundaries and an inner circumference defining the other boundary.

According to a still further aspect of the invention there is provided a guide ring structure presenting a guide surface about which a length of flexible material can be turned, the guide surface having an outer circumference and an inner circumference, characterised in that the outer and inner circumferences are of substantially equal length.

According to a still further aspect of the invention there is provided guide structure presenting a guide surface over which a length of flexible material can be turned, the guide surface extending between first and second boundaries, characterised in that the length of an arc between any two points which are on the first and second boundaries and which are aligned with each other in the direction of travel of the length of sheet material across the surface is substantially constant.

According to a still further aspect of the invention there is provided an apparatus for assembling a liner in combination with a recovery head and pipe string to assembly a shroud defined by the liner about the pipe string behind the recovery head for lining a passage created by the recovery head

BRIEF DESCRIPTION OF THE DRAWINGS

The various aspects of the invention will be better understood by reference to the following description of several specific embodiments thereof as shown in the accompanying drawings:

FIG. 4 is a further side view of the recovery head;

FIG. 5 is a section along line 5-5 of FIG. 4;

FIG. 6 is a section along line 6-6 of FIG. 4;

FIG. 7 is a section along line 7-7 of FIG. 4;

FIG. 12 is a further cross-sectional view of the tine assembly;

FIG. 13 is an end view of a first flight forming part of the tine assembly;

FIG. 14 is a fragmentary view of one end of the first flight;

FIG. 15 is a side view of a connecting plate employed in the tine assembly;

FIG. 16 is a schematic view of a tine employed in the tine assembly;

FIG. 17 is a schematic view illustrating part of the tine assembly showing use of springs for biasing tines in the tine assembly into a normal position;

FIG. 18 is a schematic view of one of the springs;

FIG. 23 is a schematic view of lateral control flaps also employed on the front screen;

FIG. 24 is a schematic side view of an endless track and associated sealing system used in the recovering head;

FIG. 25 is a side view of one of the sealing means;

FIG. 29 illustrates a male connector element forming part of a connector means for connecting longitudinal edges of the shroud together;

FIG. 30 is a view similar to FIG. 29 with the exception that a female connector element is shown;

FIG. 31 is an exploded view illustrating part of the female connector of FIG. 30;

FIG. 32 is also an exploded view illustrating part of the female connector illustrated in FIG. 31 but showing an optional sealing diaphragm;

FIG. 33 is a fragmentary schematic view of the pipe string illustrating deployment of the assembled shroud at a deployment zone;

FIG. 34 is a fragmentary schematic view illustrating the deployment zone;

FIG. 36 is a front elevational view of a guide ring structure;

FIG. 37 is an elevational view of a complimentary sealing ring structure;

FIG. 47 is a schematic view illustrating a row of water jets arranged to provide a slurry flow directed away from the recovery head;

FIG. 48 is a schematic view illustrating an operational layout for the apparatus according to the embodiment, with the recovery head shown moving in a forward direction;

FIG. 49 is a view similar to FIG. 48 with the exception that the recovery head is shown moving in a reverse direction;

DETAILED DESCRIPTION OF THE PREFERRED EMBODIMENTS

Figure 1:
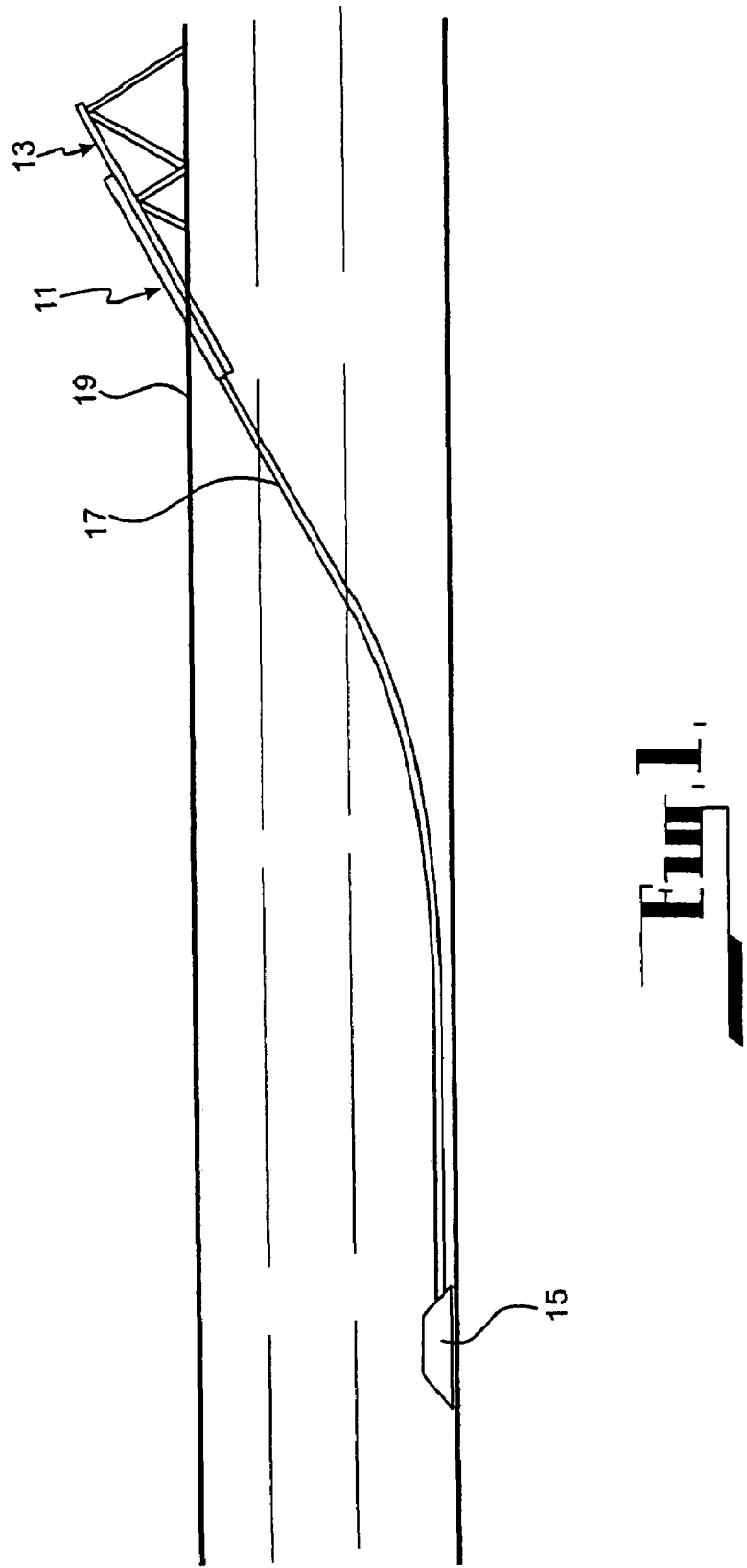
FIG. 1 is a schematic side view illustrating an underground mining operation utilising apparatus according to the first embodiment.

The embodiment shown in FIGS. 1 to 50 the drawings is directed to an underground mining apparatus 11 devised particularly for operating in continuously collapsing sand environments. The apparatus is particularly, although not solely, suitable for mining mineral sands from underground locations. The apparatus 11 is designed to recover materials from the sand environments and to deliver the recovered material to a remote location for further processing. In this embodiment, the remote location is at a station 13 at ground level 19.

The apparatus 11 comprises a recovery head 15 positioned at the lower end of a pipe string 17 which in use extends from the station 13 to the recovery head. A structure 21 for operating the pipe string 17 is provided at the station 13.

The recovery head 15 is delivered to the underground environment from which material is to be recovered in any suitable fashion such as by forming a path in the ground leading to the underground location from which material is to be recovered or, more likely, using the recovery head 15 to progressively excavate material to create a path for itself. The path for the recovery head 15 provides an access passage 23 along which the pipe string 17 extends during the mining operation. As the access passage 23 is likely to be vulnerable to collapsing about the pipe string 17, particularly in the sand environment in which the recovery head 15 is intended to operate, the passage 23 is lined with a casing defined by a shroud 25.

The recovery head 15 has a fore-and-aft axis (not shown) and comprises a body 31 having a suction chamber 33 within the interior thereof. The suction chamber 33 can receive the material to be recovered by the underground environment in slurry form and the slurry material can be extracted from the suction chamber and delivered to the station 13 at ground level via the pipe string 17.

The body 31 includes an exterior casing 35 having a front wall 37 defining a frontal surface, and a rear wall 39 defining a rearward surface. The front and rear walls 37, 39 are in spaced apart relation along the fore-and-aft axis of the recovery head 15. A top wall 41 extends between the upper ends of the front and rear walls 37, 39. The casing 35 also has side walls 43, and a bottom wall 45 which extends between the lower ends of the front and rear walls 37, 39 and which provides a base for the recovery head.

The exterior casing 35 is of articulated construction, comprising a front section 36 and a rear section 38 connected together for pivotal movement with respect to each other about a vertical axis. The two sections 36, 38 are sealingly connected together.

The body 31 includes an internal frame structure 55 within the exterior casing 35.

The front wall 37 incorporates a screen 61 through which material to be recovered in slurry form can pass into the suction chamber 33. Similarly, the rear wall 39 incorporates a screen 63 through which slurry material can pass into the suction chamber 33.

Each screen 61, 63 is in the form of a grizzly having a first side 65 which in use is exposed to oncoming slurry material, and a second side 67. The grizzly comprises a plurality of longitudinal elements 69 positioned in spaced apart side-by-side relationship to define screening gaps therebetween. The gaps provide elongate screen openings 70 through which the slurry material can pass to enter the suction chamber 33.

Each screen 61, 63 has a tine assembly 71 associated with it. The tine assemblies 71 perform a function as disclosed in International Application PCT/AU96/00106, the contents of which are incorporated herein by way of reference. The tine assembly 71 is of a construction as generally disclosed in PCT/AU96/00106 and is adapted to move through a cyclical path. In particular, in this embodiment, as best seen in FIGS. 9 to 18, the tine assembly 71 comprises two endless chain drives 72 positioned in spaced apart, side-by-side relation. Each endless chain drive 72 comprises an endless chain 73 passing around two end chain sprockets (not shown). The two endless chains support a plurality of first flights 74 and a plurality of second flights 75 supported by and extending between the chains. The flights 74, 75 are arranged alternately and are of a circular cross-section.

Each first flight 74 carries a plurality of tines 76 spaced along the length thereof at intervals corresponding to the spacing between the screen openings 70 occupied by the tines. Each tine 76 is rigidly mounted on its respective first flight 74.

Two springs 77, 78 are associated with each tine 76. Each spring 77, 78 has a coiled portion 79 and an arm portion 80. The coiled portions 79 of the two springs 77, 79 associated with each tine 76 are fitted on, and attached to, the first flight 74 which carries the tine. The arm portion 80 of one spring 77 extends to, and engages, one of the two second flights 75 on opposite sides of the first flight 74. Similarly, the arm portion 80 of the other spring 78 extends to, and engages, the other of the two second flights 74. The two springs 77, 78 are so tensioned and so arranged as to bias the first flight 74 carrying the tine 76 to assume an orientation in which the tine occupies a normal position in which it extends through its respective screen opening 70 as it travels therealong (as best seen in FIG. 18).

The ends of each first flight 74 are connected to the chain drives (not shown) through floating connectings 82. Each floating connection 82 comprises three spigots 84 mounted axially on each end of the first flight 74 and a corresponding connecting plate 86 mounted on the chain 73. Each spigot 84 has a shank portion 88 and an enlarged head portion 90. The connecting plate 86 has an aperture 92 dimensioned to accommodate the three shank portions 88 while preventing withdrawal of the head portions 90. This of course requires that the shank portions 88 of the three spigots 84 be positioned in the aperture 92 prior to the spigots 84 being fitted onto the end of the first flight 74. The aperture 92 is configured to define a primary portion 94 and a bight portion 96 dimensioned to accommodate the shank portion of spigot 84a only. The bight portion 96 is oriented so that when it is occupied by the shank portion 88 of spigot 84a, the first flight 74 is correctly oriented so that the tines 76 carried thereon are properly positioned to assume its normal position to extend through their respective screen openings 70.

In the event that one or more of the tines 76 on the first flight 74 encounter an unmanagable object (such as a boulder) which cannot be shifted, the tines 76 can deflect to allow movement passed the object. The deflection may involve two stages, the first of which involves inward deflection of the tines with respect to the screen openings 70. This inward deflection is accommodated by movement of spigot 84a in the bight portion 96 of the aperture 92 and is yieldingly resisted by the springs 77, 78. At this stage, interaction between the spigot 84a and the bight portion 96 restrains the first flight 74, and hence the tines carried thereon, against rotation. Once the spigots 84a at both ends of the first flight 74 have moved out of their respective bight portions 94, the three spigots 84 at each end of the first flight 74 occupy the primary portion 94 of their respective aperture 92, so allowing the first flight 74 to rotate. Consequently, the or each tine 76 in contact with the unmanagable object can undergo the second stage of which involves deflection through rotation in order to clear the object. The rotation of the first flight 74 is yieldingly resisted by the two springs 77, 78 associated with each tine 76 on the first flight. After the object has been cleared, the tines 76 are returned to their normal condition under the influence of the springs. The springs 77, 78 also serve to return the spigots 84a into their respective bight portions 96, so restraining the first flight 74 (and hence the tines 76 carried thereon) against rotation. Thus, the springs 77, 78 serve to initially yieldingly resist inward deflection of the tines (i.e. the first stage of deflection) and thereafter yieldingly resist rotation of the tines (i.e. the second stage of deflection).

The front wall 37 extends rearwardly and upwardly from a leading edge section 47. A blade structure 49 associated with the leading edge section 47 is adapted to cut through the sand environment upon forward movement of the recovery head 15 in the direction of the fore-and-aft axis. Similarly, the rear wall 39 extends upwardly and forwardly from a trailing edge section 51 defined between the rear wall 39 and the bottom wall 45. A blade structure 53 associated with the trailing edge section 51 is adapted to cut through the sand environment upon rearward motion of the recovery head 15 in the direction of the fore-and-aft axis. Each blade structure 49, 53 has a normal position in which it is inclined upwardly to react with the material through which it cuts upon relative movement of the recovery head 15 and thereby counterbalance downward forces exerted by the recovery head.

Each blade structure 49, 53 comprises two sections 50, 52 positioned in side-by-side relationship. The two sections 50, 52 define control flaps 54 which are angularly movable each independently of the other. With appropriate operation of the control flaps 54 either independently of each other or in unison, the recovery head 15 can be caused to ascend, descend or bank as it moves through the sand environment. In this way, some steering control of the recovery head 15 can be achieved.

Each control flap 54 comprises a bottom plate 56 and a top plate 58. The bottom plate 56 is pivotally mounted at its inner edge by hinge 60 onto the front part of the body 31 adjacent the bottom wall 45 of the body 31. Similarly, the top plate 58 is pivotally mounted at its inner edge by hinge 64 onto the front part of the body 31. The two plates 56, 58 are so arranged that the outer edge 68 of the top plate 58 is supported on, and moves relative to, the upper face of the bottom plate 56 during angular movement of the control flap 54. In this embodiment, the outer edge 68 of the top plate is slidably supported on the upper face of the bottom plate. In an alternative arrangement (which is not shown) there may be an elastic joint, or other form of flexible joint, between the outer edge 68 of the top plate 58 and the bottom plate 56.

Figure 22:
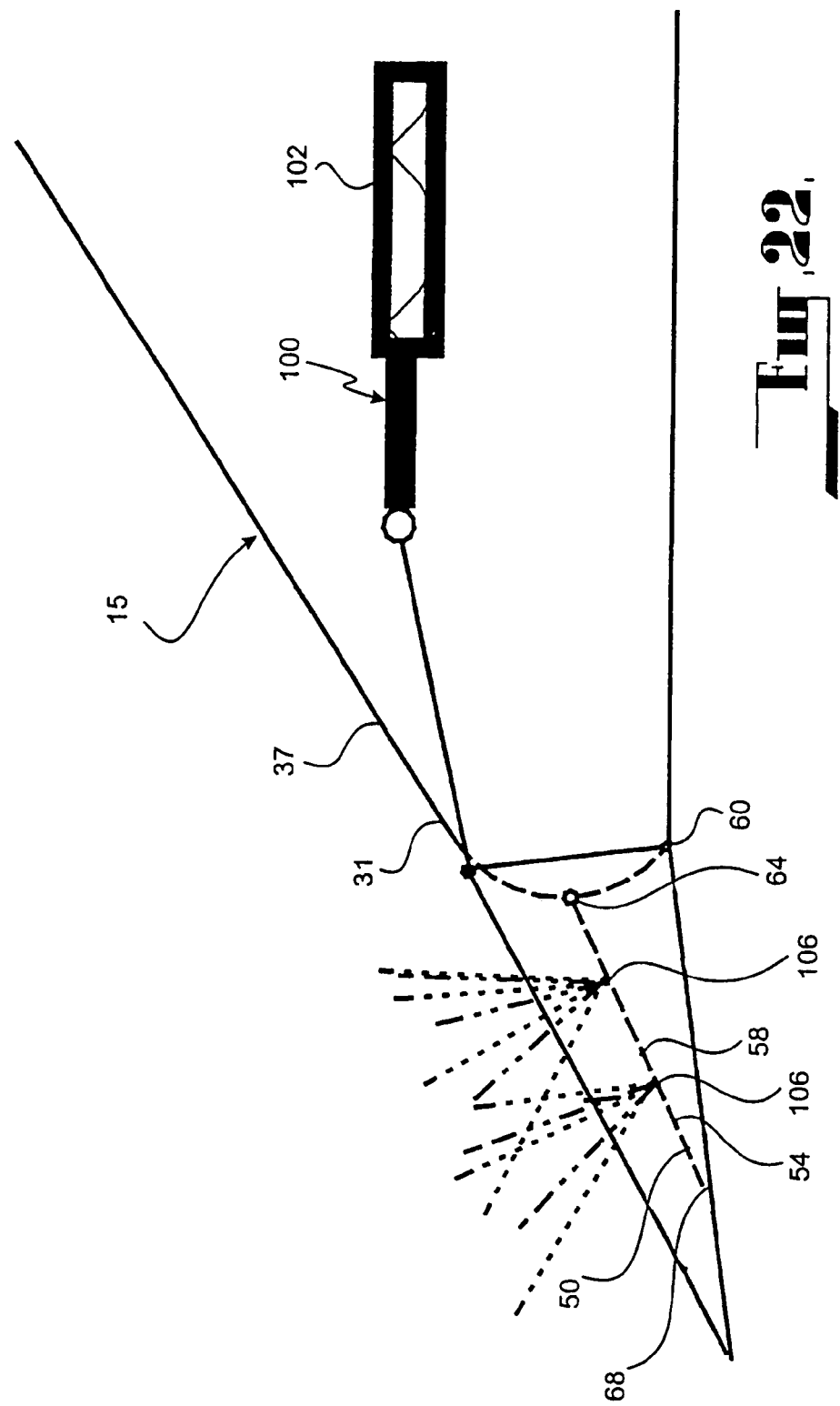
FIG. 22 is a view similar to FIG. 21 except that the control flap is shown in another position.
Figure 26:
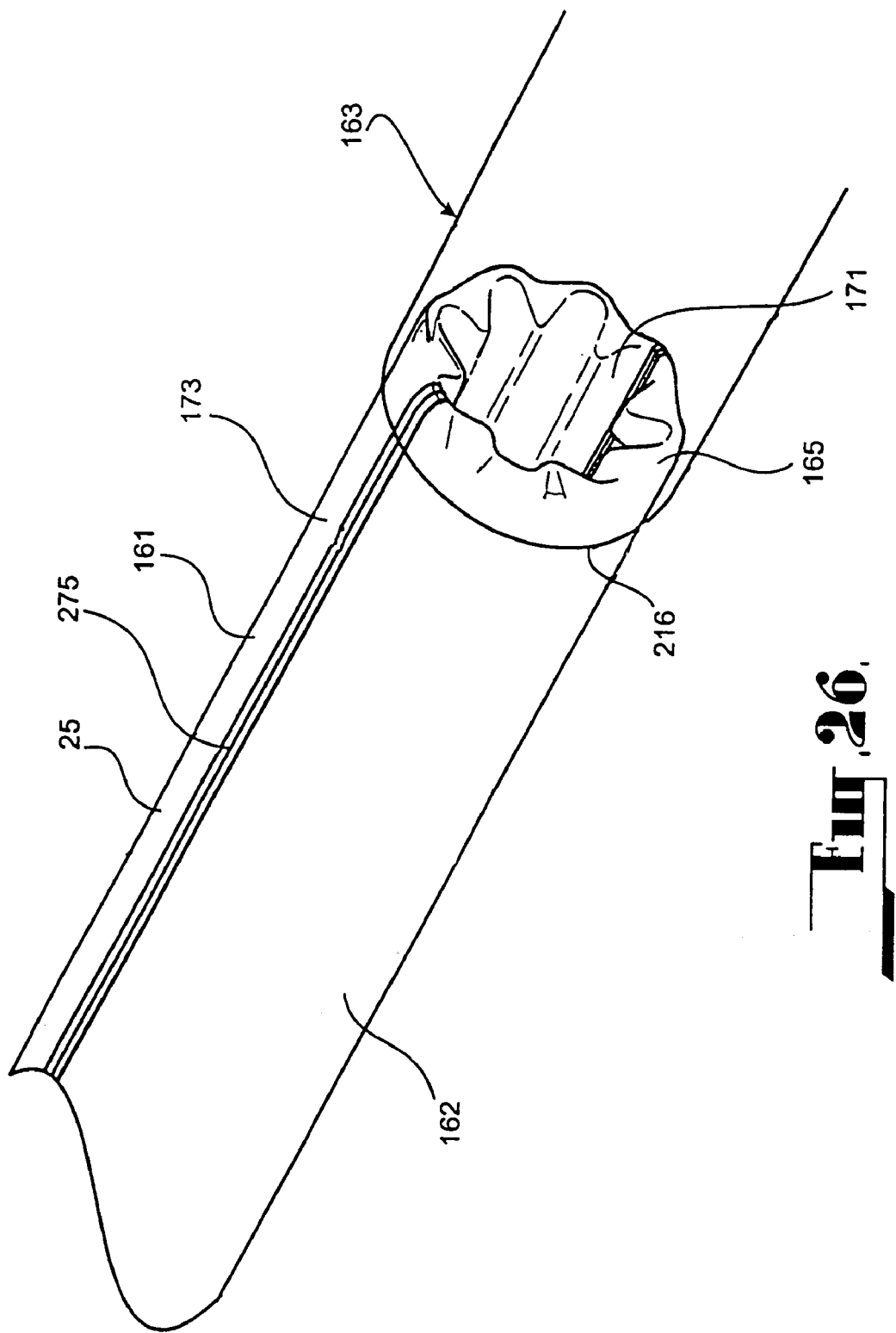
FIG. 26 is a schematic perspective view of the head end section of apparatus used in association with the recovery head to assemble a shroud for lining a passage formed by the recovery head.

A power mechanism 100 is provided for angularly moving each control flap 54. The power mechanism 100 comprises a hydraulic ram 102 or other power device operably connected between the body 31 and a crank arm 104 rigidly mounted on the bottom plate 56. The crank arm 76 is defined by a side plate 78 extending upwardly from the bottom plate 56. With this arrangement, extension and contraction of the hydraulic ram 102 causes angular movement of the bottom plate 56 about its hinge 60. The top plate 58 undergoes angular movement about its hinge 64 in response to the angular movement of the bottom plate 56. Specifically, upward angular movement of the bottom plate 56 pushes on the top plate 58 so causing it to undergo upward angular movement. Downward angular movement of the bottom plate 56 allows the top plate 58 to follow with downward angular movement caused by force of oncoming material acting on the inclined frontal face of the top plate as the recovery head moves in a forwardly direction. The sliding contact between the outer edge 68 of the top plate 58 and the bottom plate 56 accommodates the relative movement between the two plates 56, 58 as they pivot about different axes. FIG. 22 illustrates one control flap 54 which has been moved angularly downwardly with respect to its position illustrated in FIG. 21.

Means (not shown) are provided for selectively vibrating each bottom plate 56. Such means may include provision for the respective hydraulic ram 74 to undergo rapid extension and contraction movements at a very small stroke length. Alternatively, or additionally, a vibratory mechanism may be mounted on either or both of the bottom and top plates 56, 58.

Water jets 106 are provided on the top plates 58 through which water under pressure can issue to assist in clearing the zone ahead of the control flaps 54.

Lateral control flaps 40 are also provided adjacent the side walls 43 of the body 31. Each lateral control flap 40 extends along the frontal edge of the respective side wall 43 and is angularly movable about an axis generally parallel to that edge. Angular movement of the lateral control flaps 40 is controlled by power devices 42 comprising hydraulic rams 44, as shown in FIG. 22. The lateral control flaps 40 assist in sideways steering of the recovery head 15. Additionally, the lateral control flaps 40 may be used to guide oncoming material in their path either towards or away from the screen 61. In this way, the lateral control flaps 40 can be utilised to regulate the delivery of slurry material to the screen 61.

The recovery head 15 is provided with a propulsion system 81 for propelling it through the sand environment from which material is to be recovered. In this embodiment, the propulsion system 81 comprises two upper endless tracks 83 positioned in side-by-side relationship in association with the top wall 41. The propulsion system 81 further includes two front lower endless tracks 85 positioned in side-by-side relationship and two rear lower endless tracks 86 also positioned in side-by-side relationship, each in association with the bottom wall 45.

Each upper track 83 comprises an endless belt 87 passing around end rollers 89 adapted to be driven by drive motors (not shown) accommodated within the interior of the casing 35. The endless belt 87 has an outer surface 91 incorporating treads or cleats 92 for tractive engagement with the sand environment through which the recovery head is intended to move.

The endless belt 87 defines a first run 93 which is exposed to the exterior of the recovery head 15 for tractive engagement with the environment through which the recovery head is to pass and a second run 95 within the confines of the recovery head so as not to be exposed to that environment. The first run 93, which will hereinafter be referred to as the outer run, travels along the top wall 41 of the casing 35 in a direction parallel to the fore-aft-axis of the recovery head. The second run 95 will hereinafter be referred to as the inner run.

The exterior casing 35 is provided with openings 97 through which the endless belt 87 passes between the exterior and interior of the body 31.

A support structure 99 is provided in association with the outer run 93 to provide support against inward deflection thereof under loading applied to the endless belt by the surrounding environment. The support structure 99 includes a support plate 101 along which the outer run of the endless track slides. The support plate 101 is formed of a suitable low-friction material. The support plate 101 may incorporate a series of spaced apart pressure pads (not shown) each utilising a flow of water under pressure to provide additional support for the outer run of the track. Each pressure pad is provided with a valve structure having a facility to regulate water pressure delivered to the inner face of the outer run to provide support for the outer run according to loading on the track at that location.

A tensioning structure 103 is provided for tensioning the endless belt 87. The tensioning structure 103 comprises two tensioning rollers 105 in rolling engagement with the inner run 95 of the endless belt. Each tensioning roller 105 is mounted on a tensioning arm 107 one end of which is pivotally mounted onto a mounting bracket 111 secured to the internal frame structure 55 within the casing 35. The other end of each tension arm 107 is connected to the corresponding end of the other swing arm through a tensioning ram 113 whereby extension and retraction of the tensioning ram 113 causes pivotal movement of the tensioning arms 107 about their respective mounting brackets 111 and consequently displacement of the tensioning rollers 105. This displacement of the tensioning rollers 105 deflects the inner run 95 of the endless track, the extent of deflection controlling the extent of tensioning of the endless belt. The arrangement also allows the tensioning rollers 105 to rise and fall with pivotal movement of the tensioning arms 107 to accommodate irregularities (such as treads or cleats) on the endless belt.

As previously mentioned, openings 97 are provided within the casing through which the endless belt moves between the exterior and interior of the casing 35.

Figure 2:
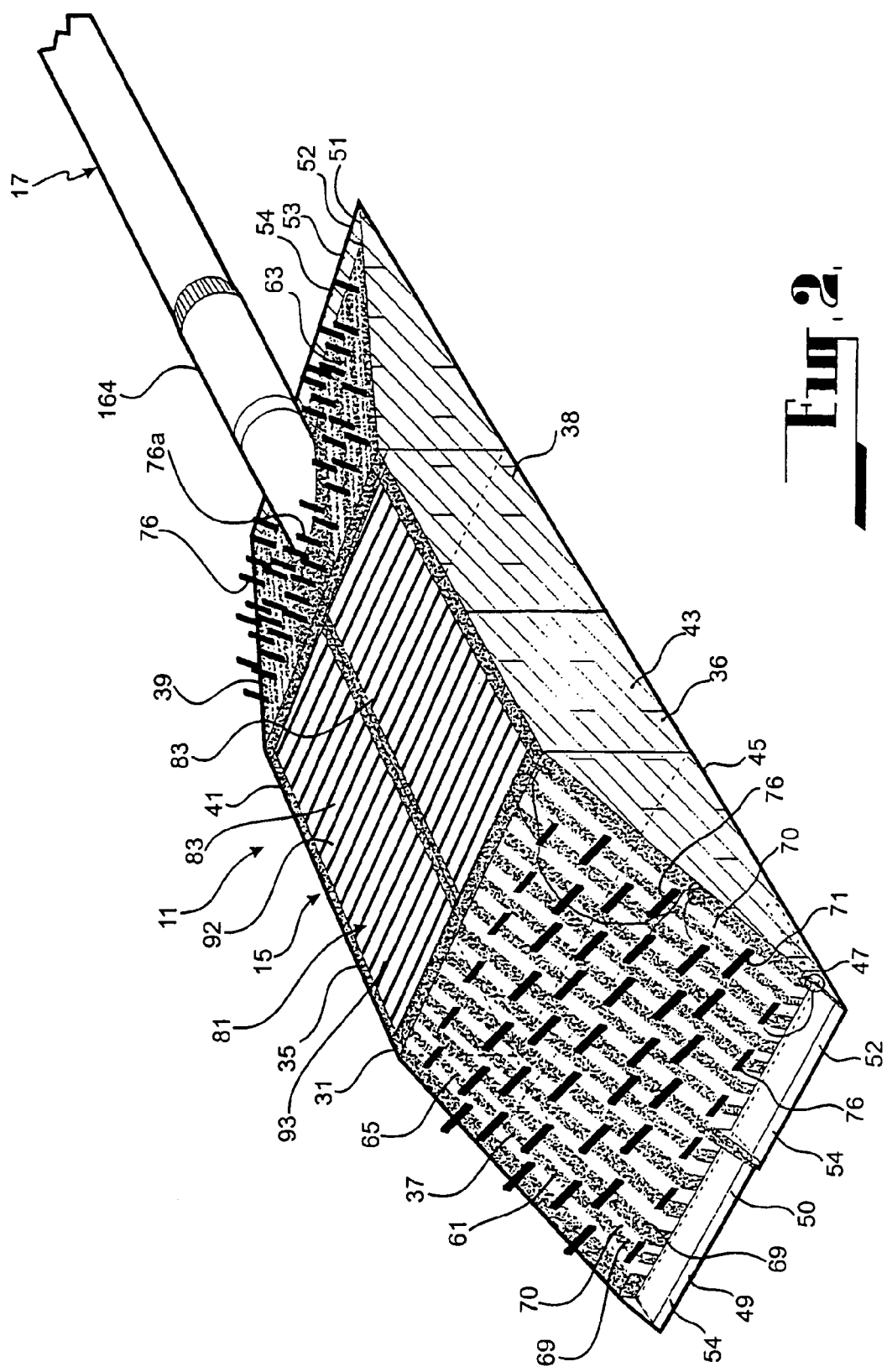
FIG. 2 is a perspective view of apparatus according to the embodiment.
Figure 3:
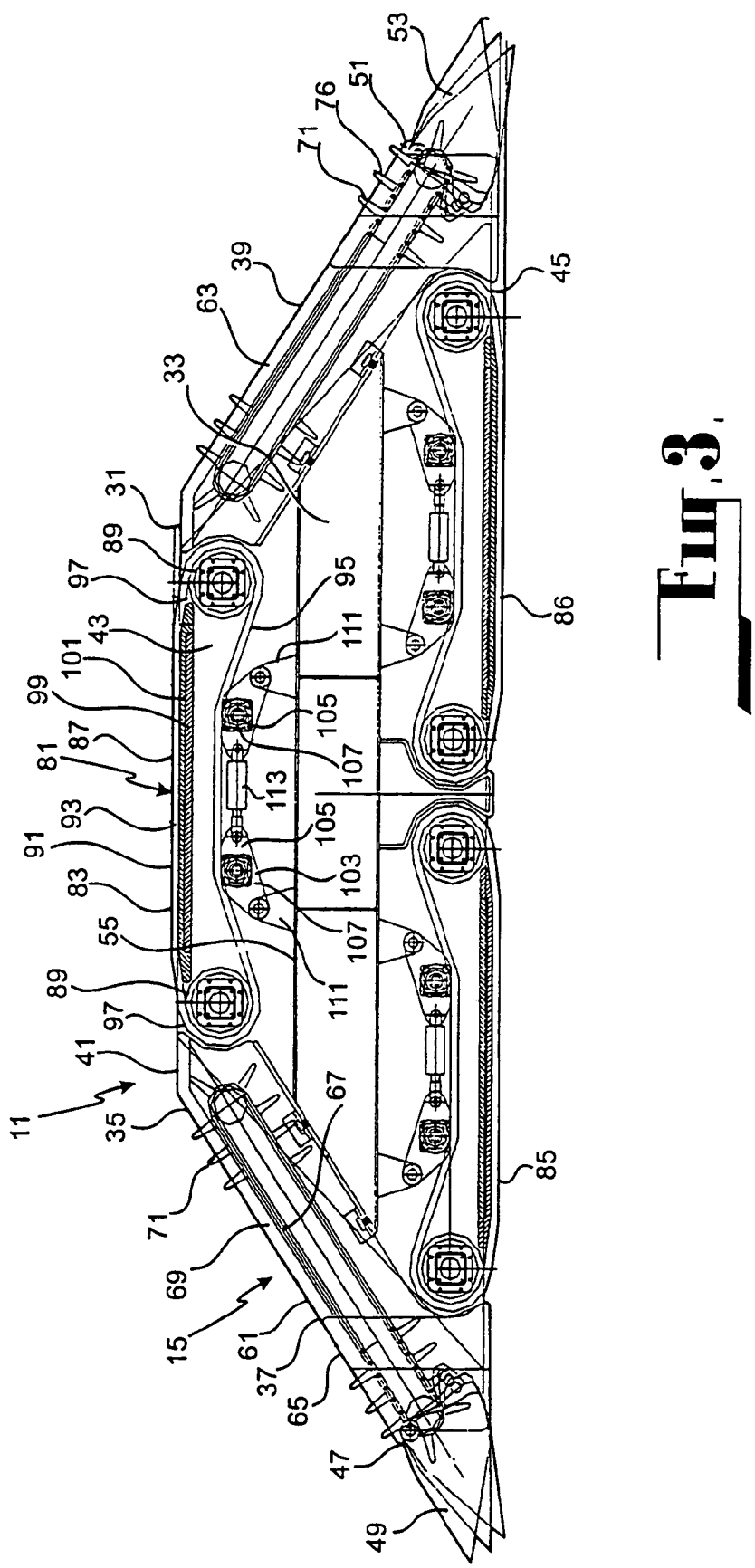
FIG. 3 is a schematic side view of a recovery head forming part of the embodiment.
Figure 8:
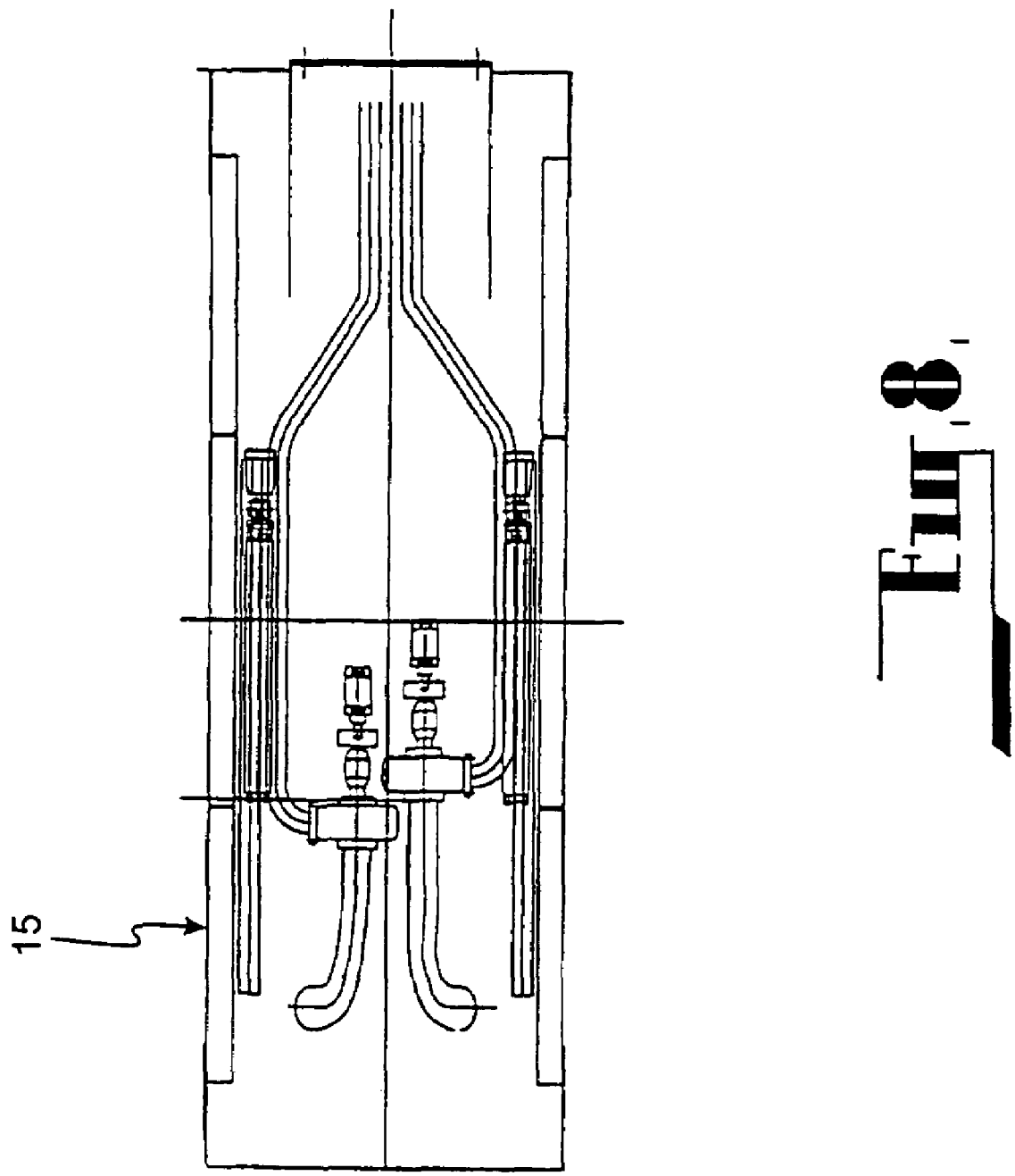
FIG. 8 is a section along line 8-8 of FIG. 4.

A sealing means 115 is associated with each opening 97 to inhibit ingress of sand and other unwanted material into the interior of the casing through the opening. The sealing means 115 comprises a seal flap 117, as shown in FIGS. 2 and 3 of the drawings. The seal flap 117 has two opposed edges 119, 121. One edge 119 is mounted onto the top wall 41 of the casing 35 by way of hinge 123. The other edge 121 of the sealed flap 117 is adapted to sealingly contact the outer run 93 of the endless belt 87. With this arrangement, the seal flap 117 provides a seal between the outer run 93 and the top wall 41 to inhibit the ingress of sand and other unwanted material into the interior of the casing.

The hinge connection between the seal flap 117 and the top wall 41 allows the seal flap to rise and fall as necessary to accommodate irregularities (such as a treads or cleats) on the outer face of the endless belt.

The seal flaps 117 are positioned inwardly with respect to the outer surface of the outer run 95 of the endless belt 87 (as best seen in FIGS. 24 and 25 of the drawings) so as not to impede operation of the track. In other words, the seal flaps 117 are so positioned as to not interfere with tractive engagement between the track and the environment in which the recovery head 15 is operating by limiting the depth to which treads or cleats on the endless track can penetrate into the surrounding material.

Each seal flap 117 has an outer face 125 which is configured to interact with oncoming material in the environment through which the recovery head passes, such that interaction between the oncoming material and the seal flap biasing the seal flap into sealing engagement with the endless track. In this embodiment, the outer face 125 is of convex configuration for such purpose. While not shown in the drawings, the seal flap 117 is also provided with a spring for further biasing the seal flap into sealing engagement with the endless track.

A cleaning system is provided to clean sand and other unwanted material away from the sealing edge 121 thereby maintaining integrity of the seal. The cleaning system comprises water jets including orifices 127 positioned in the seal flap adjacent the edge 121 whereby water under pressure can issue from the orifices to maintain the sealing zone about the edge free of sand. The water may be delivered to the orifices 127 through a delivery system which incorporates a flow path through the hinge 123.

The lower tracks 85, 86 are of a similar construction to the upper tracks 83, with the exception that sealing means are not required at the openings 97 through which the tracks move between the interior and exterior of the casing.

A positive pressure is also maintained within the interior of the casing 35 to resist entry of sand into the interior of the casing. The positive pressure may be provided by pressurised water.

While not shown in the drawings, a suction system is provided within the casing 35 in the vicinity of the upper tracks 83 and also the lower tracks 85, 86 to extract any sand which enters the interior of the casing 35.

The interior of the casing 35 also accommodates drive systems for operating the recovery head. The drive systems include electric motors driving hydraulic pumps which in turn drive hydraulic motors for driving the endless tracks 83, 85, 86. The drive systems may be accommodated in a sealed oil bath in order to protect them from the aggressive environment in which the recovery head operates.

Material to be recovered enters the suction chamber 35 within the body 31 after passing through the front screen 61 from the first side 65 thereof to the second side 67. The material passing through the front screen 61 is directed to the suction chamber 33 through an intake region.

A pumping system 128 is utilised to transfer the recovered material from the suction chamber 33 to the station 13 at ground level along the pipe string 17. The pumping system 128 for conveying the recovered material from the recovery head to the station 13 may utilise pumps of any suitable type such as jet pumps or centrifugal pumps. The pumping system 128 includes front intakes 129 for extracting recovered material from a sump area in the suction chamber 33.

An internal pumping system 132 is provided for transferring recovered material from the rear section of the suction chamber 33 to the front section thereof where it can be extracted by the front intakes 129 of the pumping system 128. The internal pumping system 132 includes intakes 134 and outlets 136, with jet pumps 138 for pumping the material from the intakes to the outlets.

In addition to conveying recovered material from the recovery head 15 to the station 13 at ground level, the pipe string 17 may also be employed to deliver replacement material from the station 13 to the underground location at which the recovery head is operating. In such a case, the replacement material is utilised to replace at least a portion of the material recovered from the underground location. The replacement material may be derived from the recovered material after processing thereof, or may be material derived from another source, or it may be a combination of both.

Figure 27:
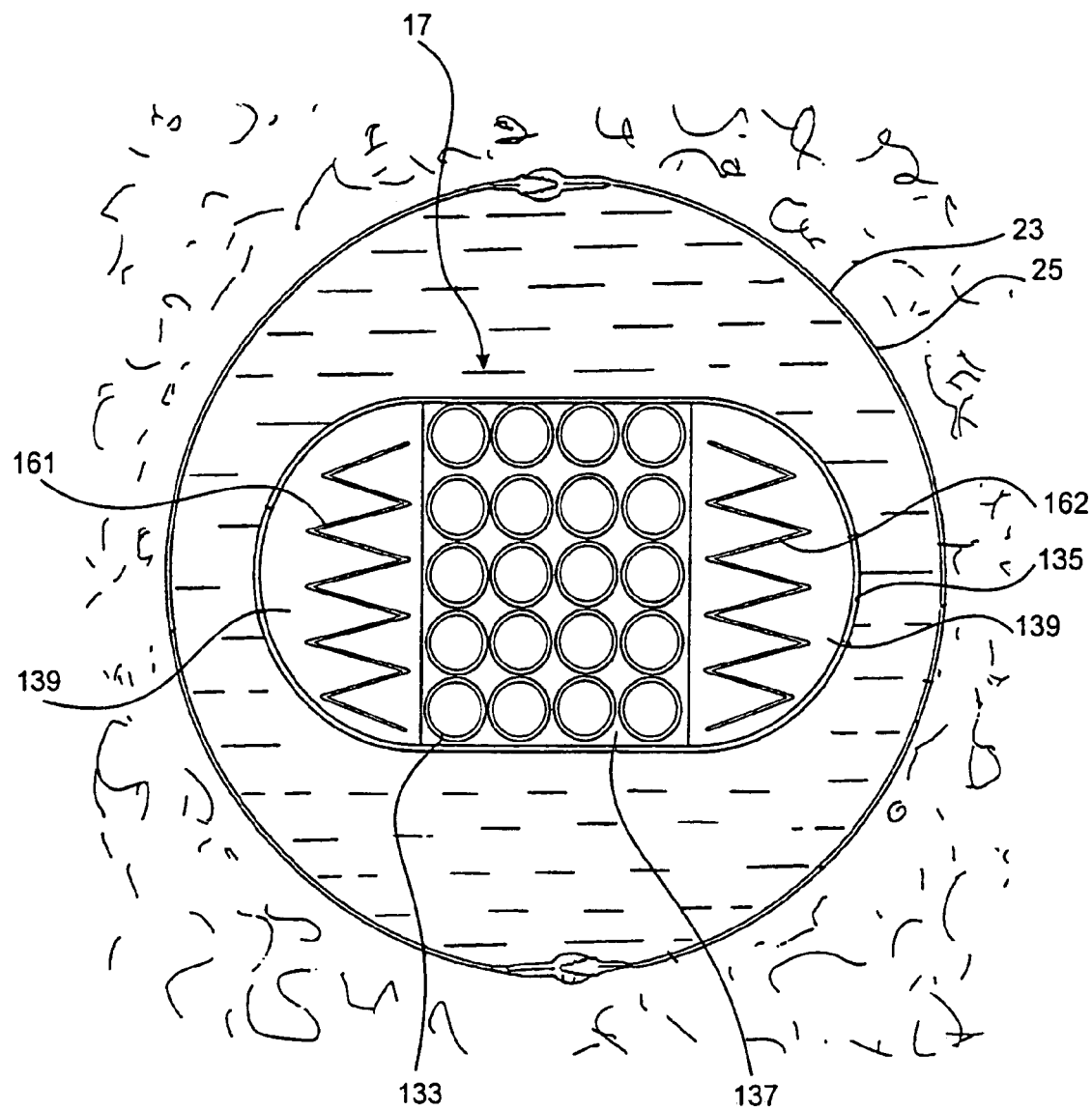
FIG. 27 is a cross-sectional view of the assembly of components released from the apparatus shown in FIG. 24.
Figure 28:
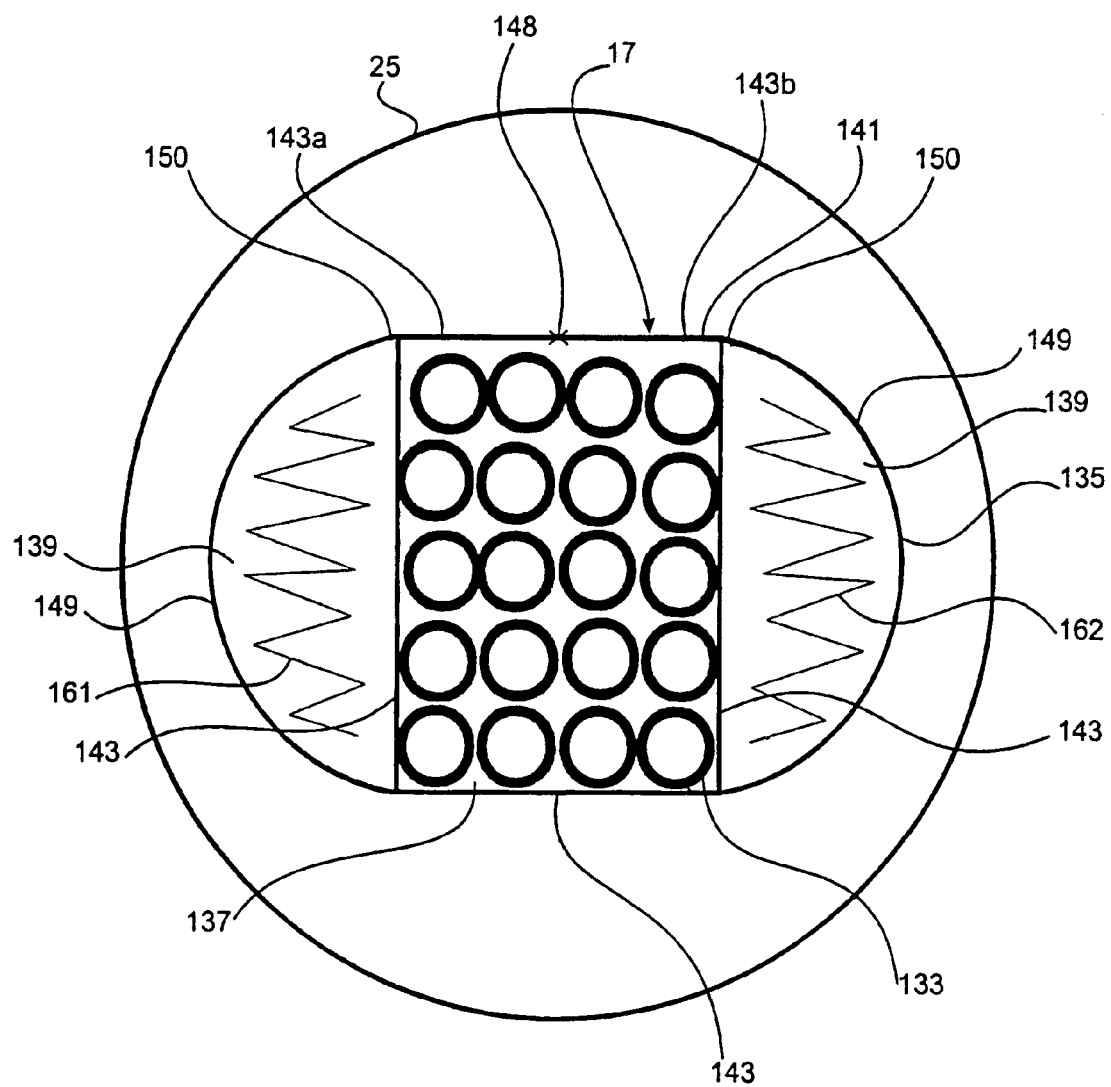
FIG. 28 is a view somewhat similar to FIG. 27.
Figure 35:
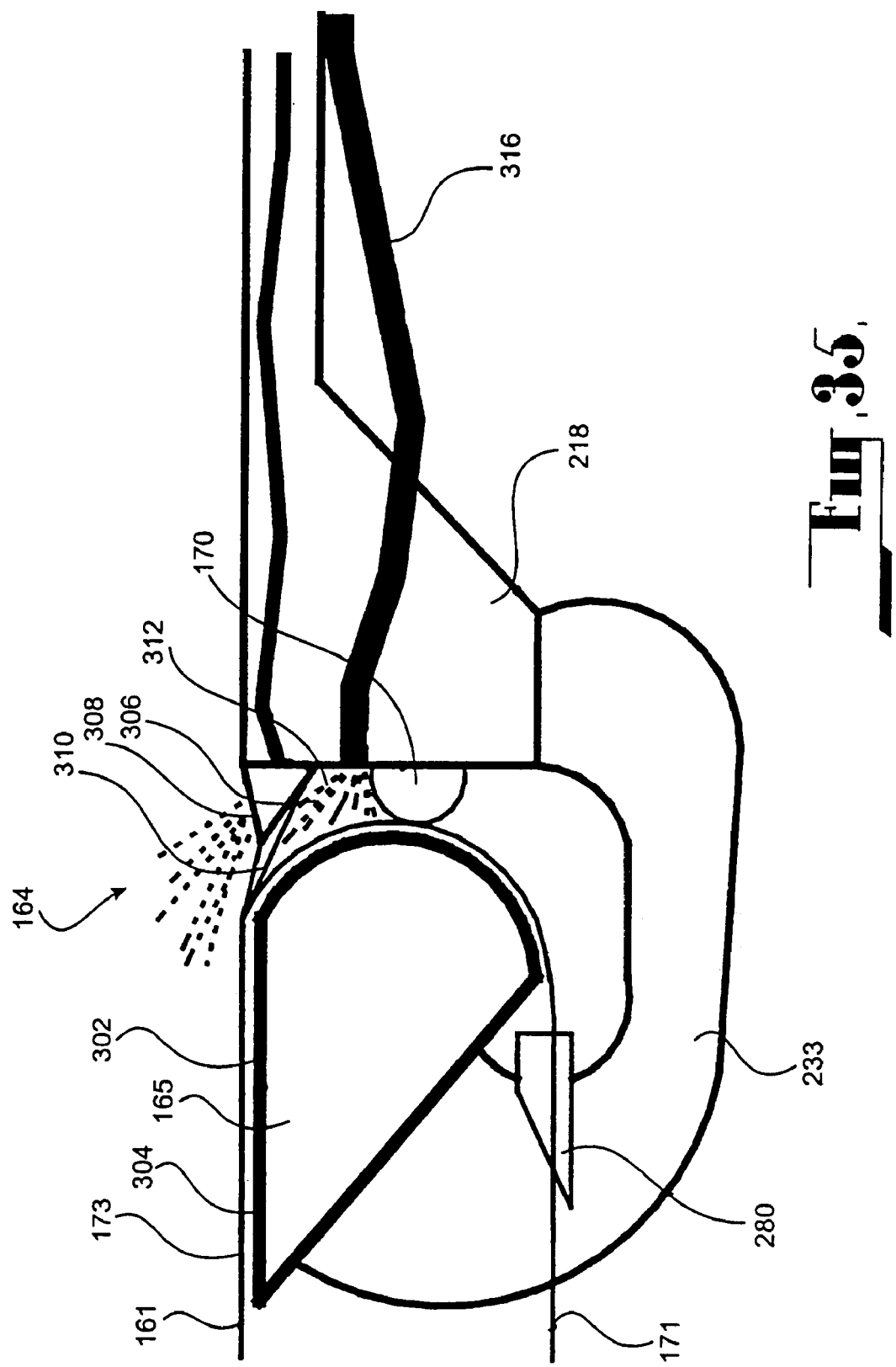
FIG. 35 is a fragmentary cross-sectional view at the deployment zone.
Figure 38:
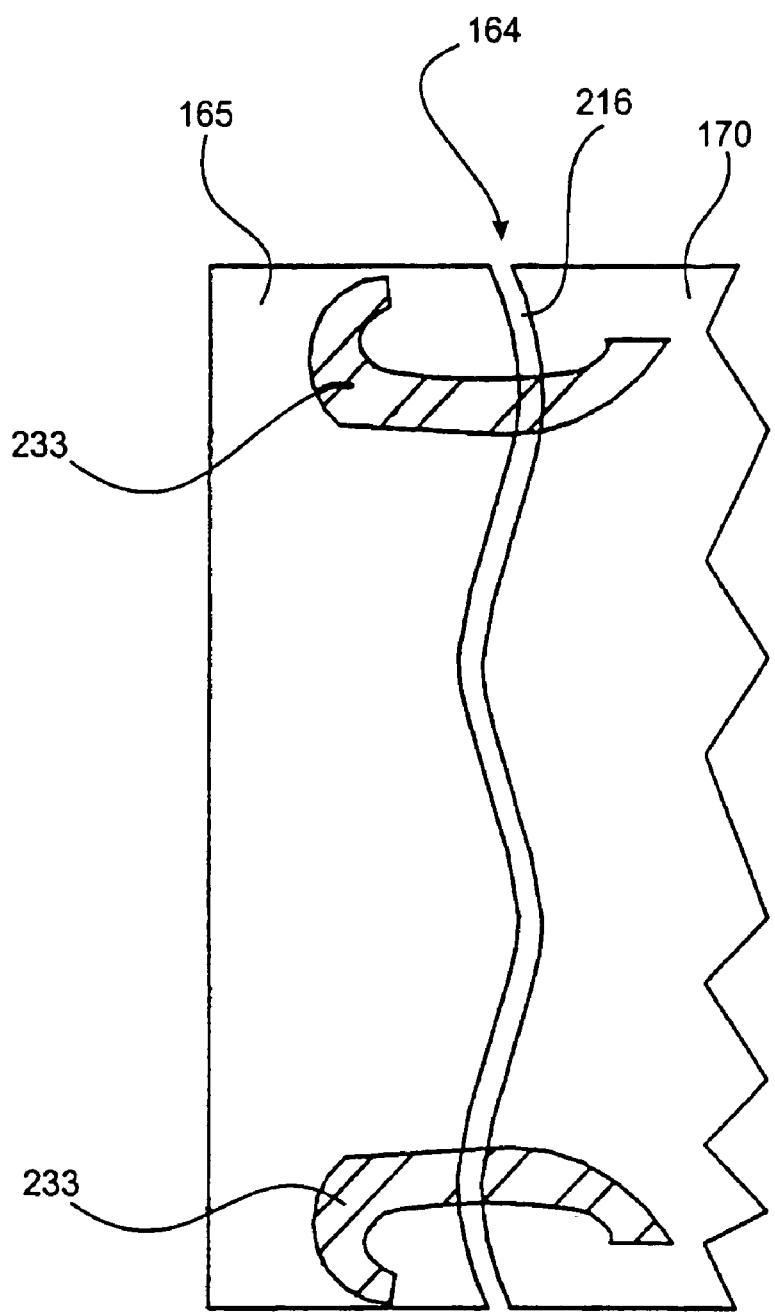
FIG. 38 is a schematic view of the guide ring structure and complimentary sealing ring structure at the deployment zone.
Figure 39:
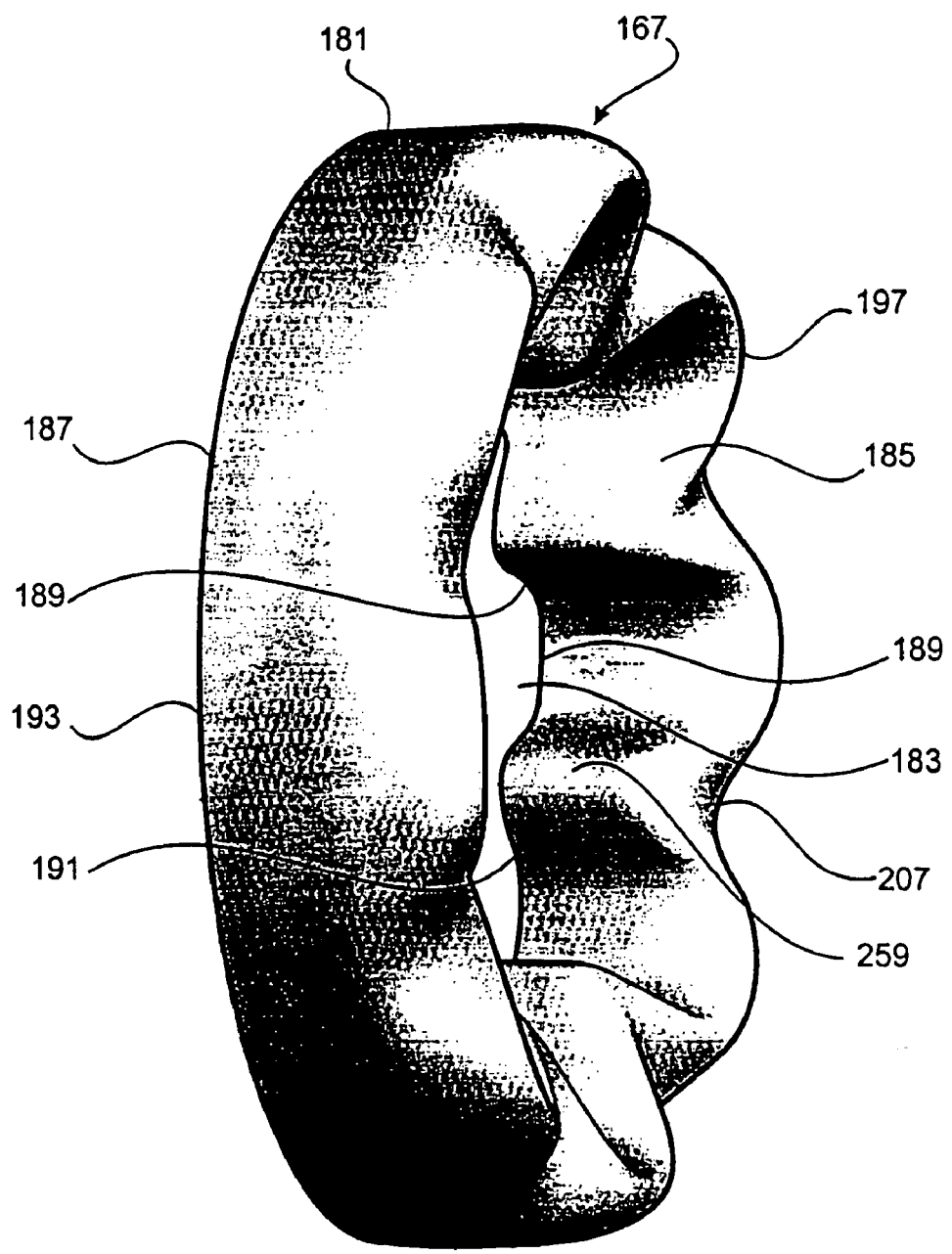
FIG. 39 is a perspective view of the guide ring structure.
Figure 40:
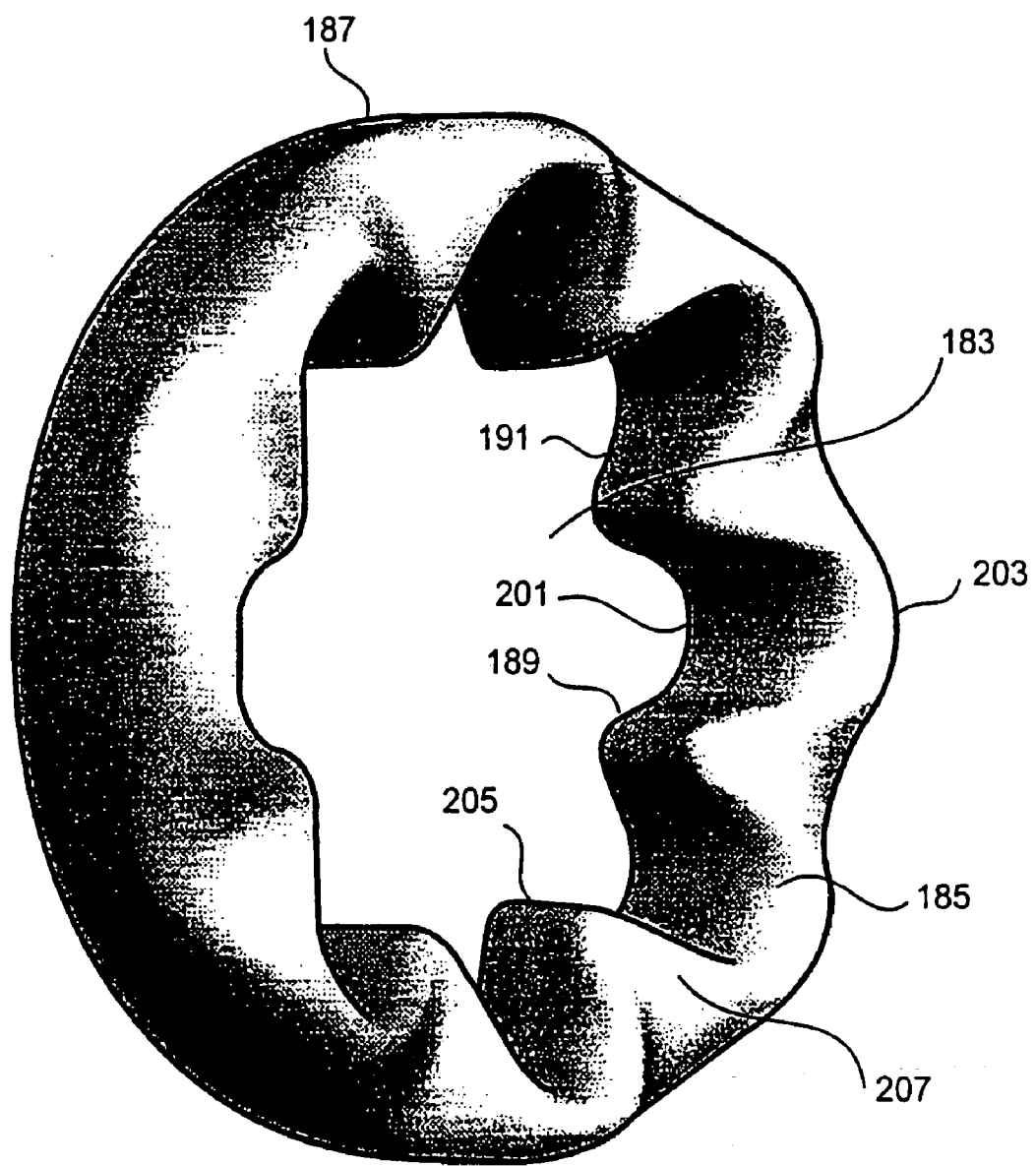
FIG. 40 is a further perspective view of the guide ring structure.

The pipe string 17 incorporates separate passages for the various functions it provides, as best seen in FIGS. 27 and 28 of the drawings. In particular, the pipe string 17 includes a plurality of umbilical conduits 133 positioned in side-by-side relationship and secured to a support structure (not shown) including a steel cable or hawser carrying frame work which supports the conduits.

The conduits 133 and the support structure on which they are supported are accommodated within an elongate enclosure 135 in the form of a sack which extends along the length of the pipe string 17. The sack 135 defines a central compartment 137 in which the conduits 133 are accommodated and two lateral compartments 139 each to one side of the central compartment. The elongate sack 135 is formed of an assembly of panels 141 of flexible material. In particular, the central compartment 137 is defined by four panels 143 connected together in a rectangular configuration. One panel 143 is formed in two sections 143a, 143b which can be releasably connected together at 147 by any suitable releasable joint 148 such as a zip. Each lateral compartment 139 is defined between a respective lateral panel 149 and a respective one of the panels 143 adjacent thereto. Each lateral panel 149 is adapted to be releasably connected to the respective panel 143 forming part of the central compartment 137 in any suitable fashion such as a releasable joint 150 such as a zip.

With this arrangement, the enclosure 135 can be conveniently manufactured and can be transported to station 13 in a collapsed condition. The enclosure 135 can then be progressively assembled about the conduits 133 as the pipe string is assembled in order to create the central compartment in which the conduits are accommodated as well as the two lateral compartments 139.

An inflation fluid such as water is introduced into the central compartment 137 and into the two lateral compartments 139 to provide form and shape to the enclosure 135.

As previously mentioned, a shroud 25 is provided about the pipe string 17 for lining the access passage 23 created by the recovery head 15 in order to support the surrounding material in which the passage 23 is formed and prevent it from collapsing onto the pipe string.

The shroud 25 is formed from flexible material which is delivered in longitudinal sections, there being two such longitudinal sections 161, 162 in this embodiment. Each longitudinal section 161, 162 of flexible material is stored in roll form at station 13 situated at ground level and is unwound from the roll as the pipe string 17 advances. With this arrangement, the shroud 25 can be deployed over long distances.

The pipe string 17 has a head end section 163 at which the shroud 25 is assembled and deployed as will be explained. The assembled shroud 25 is deployed at a deployment zone 164 on the head section 163.

The longitudinal sections of flexible material 161, 162 are delivered to the head end section 163 in a laterally reduced condition so as to be in a compact form. Specifically, each longitudinal section 161, 162 is delivered along the pipe string 17 in a respective one of the two lateral compartments 139 defined within the enclosure 135. In this way, each lateral compartment defines a path for the respective longitudinal section 161, 162 of flexible material which it accommodates. As shown in FIGS. 27 and 28, the longitudinal sections 161, 162 assume a laterally reduced condition by being folded into a pleated arrangement. This is an effective way of permitting the longitudinal sections 161, 162 to be transported along the pipe string in a compact condition. The length of flexible material can, however, be laterally reduced to assume a compact condition in any other fashion such as simply being laterally scrunched together.

At the head end section 163 of the pipe string 17, there is provided a guide structure 165 presenting a guide surface 167 over which the longitudinal sections 161, 162 of flexible material can pass after exiting from their respective paths in the enclosure 135.

Prior to contacting the guide structure 165, the longitudinal sections 161, 162 are joined together. In this regard, each longitudinal section of flexible material 161, 162 has two longitudinal edges provided with a connector assembly 275 which facilitates releasable connection of adjacent longitudinal edges together to assemble the shroud 25.

Each connector assembly 275 comprises a first connector element in the form of a male element 277 and a second connector element in the form of a female connector element 279, as best seen in FIGS. 29 and 30 The arrangement is such that the male connector element 277 of each longitudinal section 161, 162 is arranged for engagement with the female connector element 179 of the other longitudinal section in the manner of a zipper. The male and female connector elements 277, 279 are guided into zipping engagement with each other by way of a slider 280. In this way, the longitudinal edges of the two longitudinal sections 161, 162 can be zipped together to form the shroud. Guide means such as guide rollers are provided to guide the respective connector elements 277, 279 to the slider 280.

The connector assembly 275 provides a continuous and watertight connection between the two longitudinal sections 161, 162.

The male connector element 277 comprises a head portion 283 and a trail portion 285. The trail portion 285 is affixed to a longitudinal edge of the respective longitudinal section flexible material 161. The head portion 283 has provided thereon a series of recesses 287 and terminates at a nose 288. The female connector element 279 comprises a body 286 having two jaw sections 282, 284 defining therebetween a channel portion 291. The body 280 also has a tail portion 293. The tail portion 293 is affixed to a longitudinal edge of the other longitudinal section of material. The channel portion 291 has provided on an inner surface 295 thereof a series of ridges 297 complimentary to the recesses 287 of the male connector element 277. The free end of each jaw section 282, 284 is provided with a tooth formation 292 adapted to lock into engagement with a complementary tooth recess 294 provided on the inner region of the head portion 183. Each tooth formation 292 is progressively pressed into locking engagement with its corresponding tooth recess 294 under the influence of the slider 280 as the male and female connector elements 277, 279 are zipped together. Upon zipping together of the connector elements 277 and 279, the head portion 283 is received within the channel portion 291 between the jaw sections 282, 284, with the nose 288 locating against the inner end of the jaw sections 282, 284.

Inter-engagement between each tooth formation 292 and the corresponding tooth recess 294 provides a pivot about which the respective jaw sections 282, 284 can pivot under the influence of a separating force applied to the connector elements 277, 279 so as to urge the jaw sections inwardly. This has the effect of urging the ridges 297 and recesses 287 into engagement.

The inner surfaces 295 of the channel portion 291 converge towards each other in a direction away from the opened end of the channel to terminate at one end of a slit 301 extending into the body 286 in the direction away from the opening. The other end of the slit 301 terminates at a hole 303 which defines a hinge 305 between the two jaw sections 282, 284 to facilitate movement of the two jaw sections towards and away from each other.

The ridges 297 and recesses 287 engage in a manner such that a force applied to pull the connector elements 277 and 279 apart causes the channel portion 291 to grip the head portion 283 with greater force by accentuating positive engagement of the ridges 297 and recesses 287.

In a variation shown in FIG. 32, the slit 301 may incorporate a sealing diaphragm 305 against which the nose 288 of the male connector element may sealingly engage.

As detailed above, the assembled shroud 25 is deployed through the deployment slot 216 at the deployment zone 164.

The guide structure 165 is provided with a peripheral portion 302 extending away from the guide surface 167 to define a mandrel 304 for temporarily retaining the outer section 173 in an expanded or spread-out condition until it is exposed to the pressure of an inflation fluid, as will be explained later.

An annular space 306 is provided at the deployment zone 164, exteriorly of the deployment slot 216.

A seal 308 is provided for inhibiting ingress of sand and other matter into the annular space 306. The seal 308 comprises a flexible blade element 310 adapted to wipe against the assembled shroud 25 as it is deployed. The region 312 defined between the deployment slot 216 and the seal 308 receives flushing water under pressure which flows outwardly between the tip of the blade element 310 and the shroud 25 so as to flush sand and other matter away from the deployment zone 164. The flushing water is delivered to the flushing region 312 by way of a delivery line 316. The flushing water is delivered into the flushing region 312 in a manner which establishes a spiralling water flow within the region and a spiralling leakage past the seal 308.

Additionally, spray means 318 are provided to spray water into the environment immediately outwardly of the seal 308 to clean the exterior surface of the shroud 25. Such cleaning action is particularly desirable where the assembled shroud 25 is being retracted.

The guide structure 165 is configured to facilitate spreading of the longitudinal sections of flexible material 161, 162 which are now joined together, as they turn about the guide surface and travels towards an assembly zone 169.

The guide structure 165 is positioned adjacent the ends of the lateral compartments 139 which provide the paths along which the longitudinal sections of flexible material 161, 162 travel. On exiting from the path provided by its respective lateral compartment 139, the longitudinal section 161, 162 are joined together at an assembly zone defined by the sliders 280 and then turn about the guide surface 167 to provide an inner section 171 and an outer section 173 which is turned back with respect to the inner section.

The guide surface 167 presented by the guide structure 165 is of a profile which facilitates spreading of the flexible material in a manner which precludes formation of wrinkles in the outer section 173.

The guide structure 165 in this embodiment comprises a guide ring structure 168 as best seen in FIGS. 39 to 43 of the drawings.

The guide ring structure 168 comprises a ring body 181 having a central opening 183. The ring body 181 presents the guide surface 167 about which the longitudinal sections 161, 162 are adapted to turn, with the inner section 171 entering the ring body 181 through the central opening 183 and then turning around the guide surface 167 such that the outer section 173 leaves from the outer periphery of the ring body 181.

Figure 41:
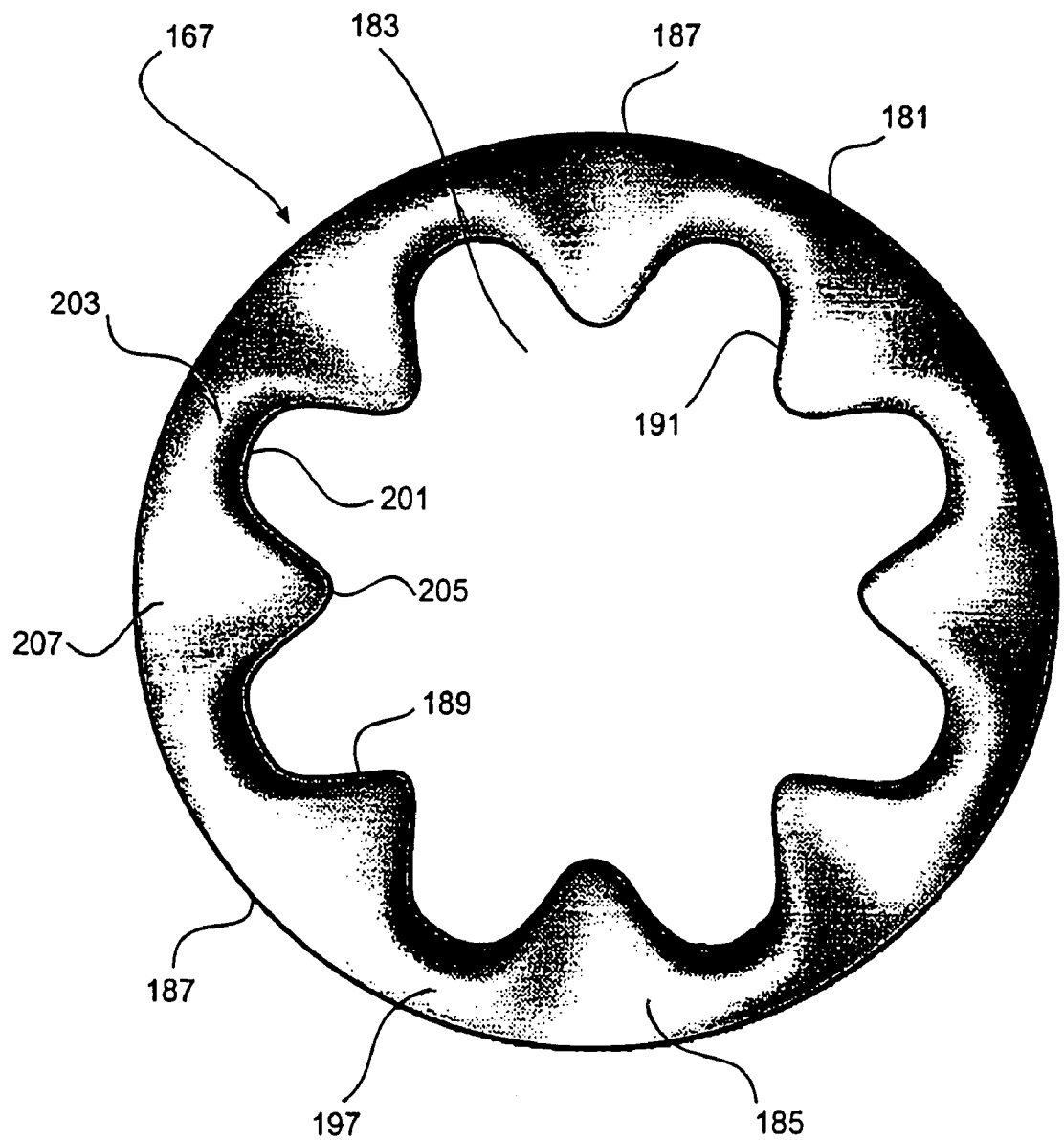
FIG. 41 is a front elevational view of the guide ring structure.

The ring body 181 has an outer circumference 187 and an inner circumference 189. The outer circumference 187 is generally circular. The inner circumference 189 is configured to provide a first substantially sinusoidal formation 191, as best seen in FIG. 41 of the drawings.

Figure 42:
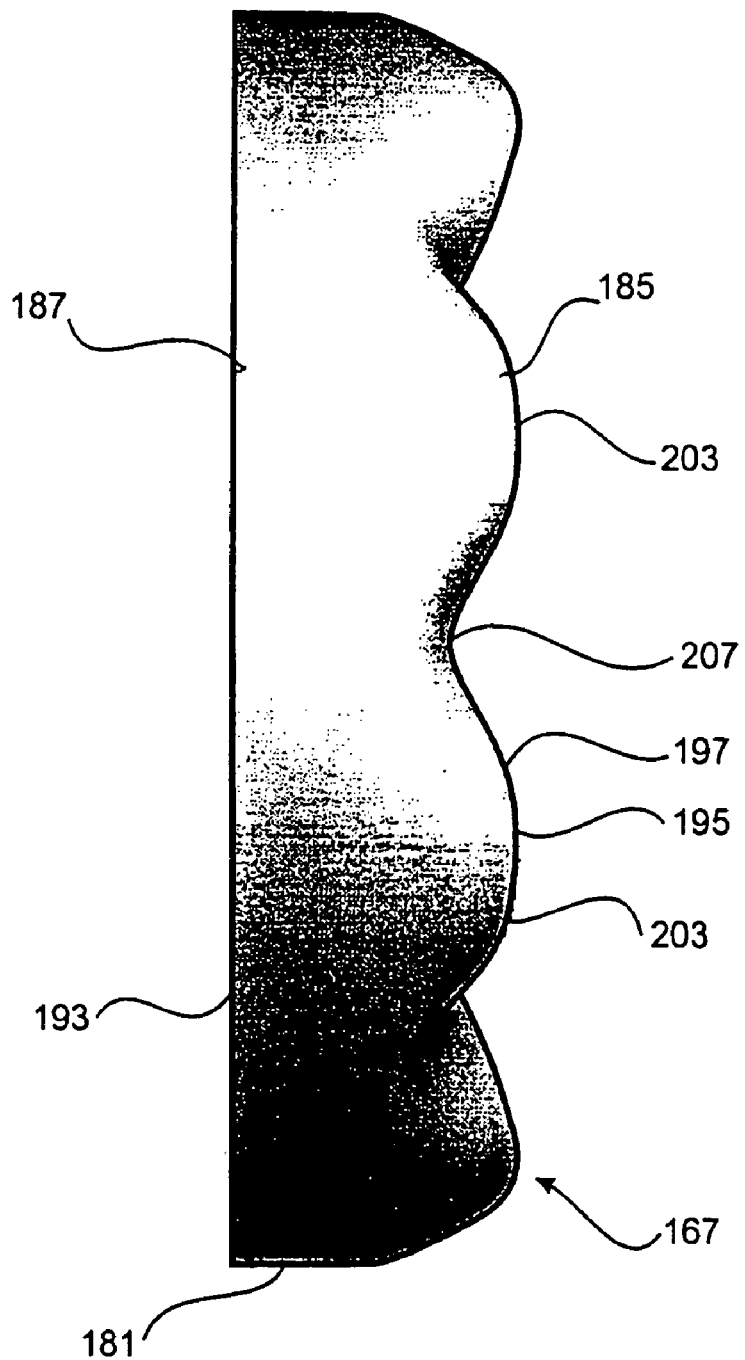
FIG. 42 is a side elevational view of the guide ring structure.

The ring body 181 has a first axial end 193 and a second axial end 195. The first axial end 193 is at the outer circumference 187 of the ring body 181 and so is generally circular. The second axial end 195 is configured to provide a second generally sinusoidal formation 197 when viewed in side elevation, as best seen in FIG. 42.

The first sinusoidal formation 191 and the second sinusoidal formation 197 are out of phase such that each trough 201 of the first sinusoidal formation 191 registers with a respective crest 203 of the second sinusoidal formation 197 in a radial direction of the ring body 181, and each crest 205 of the first sinusoidal formation 191 registers with a respective trough 207 of the second sinusoidal formation 197 in the radial direction of the ring body. This can be best seen in FIGS. 39, 40 and 41 of the drawings.

With this arrangement, the length of the inner circumference 189 equals the length of the outer circumference 187.

Figure 43:
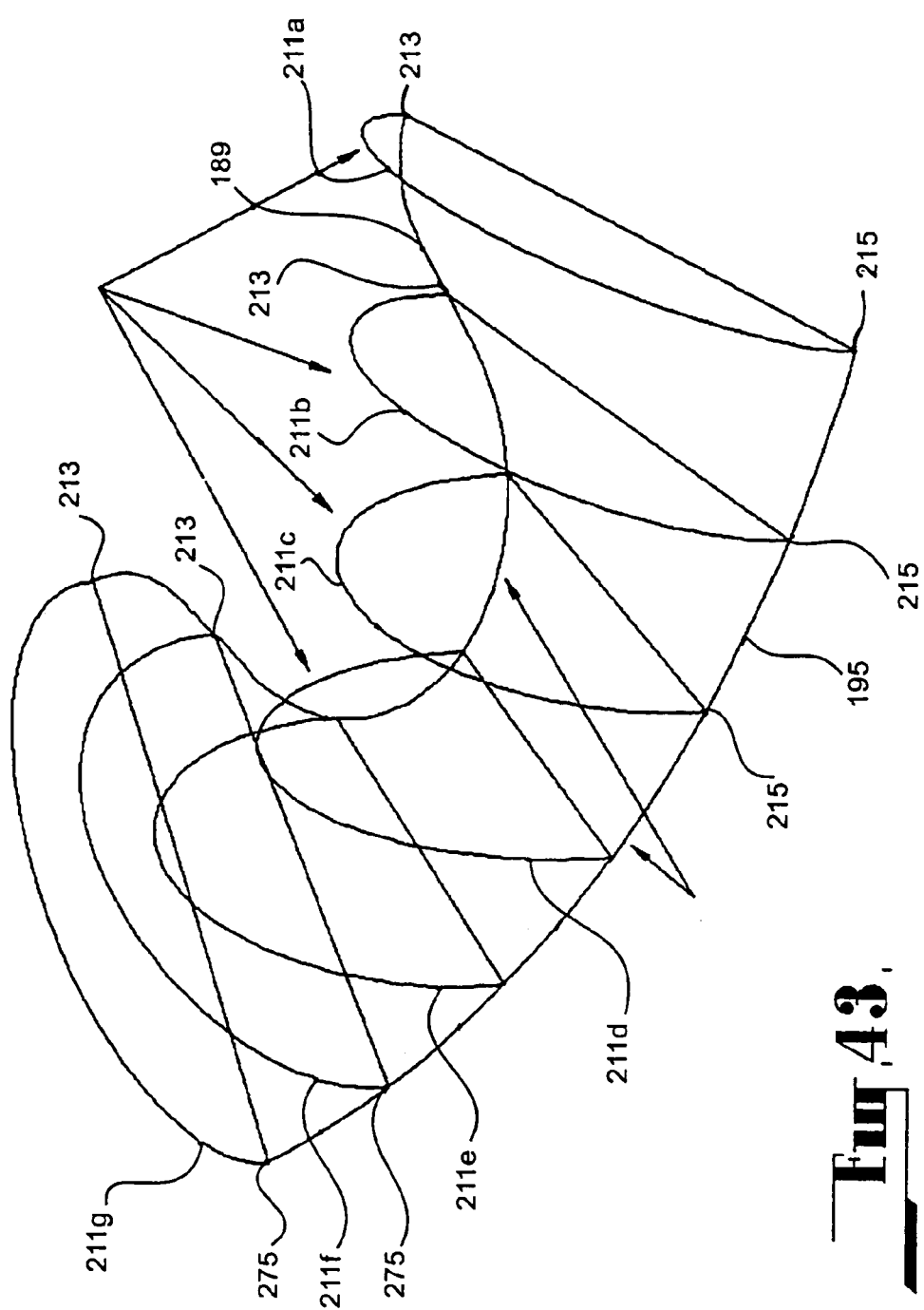
FIG. 43 is a schematic view illustrating some geometrical characteristics of the ring structure.

A further characteristic of the configuration of the guide surface 167 will now be described with reference to FIG. 43 of the drawings. The configuration of the guide surface 167 provides that any arc 211 extending across the guide surface 185 from a point 213 on the inner circumference 189 to a radially aligned point 215 on the outer circumference 187 is of constant length. In other words, the arcs 211a, 211b, 211c, 211d, 211e, 211f and 211g shown in FIG. 43 are each of the same length.

With this configuration of the guide surface 167, the lateral extent to which each longitudinal section 161, 162 is in contact with the guide surface 185 as it turns to provide the inner section 171 and the outer section 173 is substantially constant. Because of the substantially constant lateral extent of contact, there is no significant tendency for irregularities such as creases, wrinkles and folds to form in the outer section 173, and thus in the assembled shroud 25.

With the guide ring structure 168 of such configuration, it is possible to employ a sealing ring 170 of complementary construction, with a space therebetween defining the deployment slot 216 at the deployment zone 164.

The sealing ring 170 has a sealing surface also of sinusoidal formation, with the crests of that sinusoidal formation nestled into the troughs of the second sinusoidal formation 197 on the guide ring structure 167, and vice versa.

The ring body 181 is supported on radial retaining arms 233, the inner ends of which are mounted on a support ring 218. The retaining arms 217 are connected to the ring body 181 on the side thereof opposite to the guide surface 185; that is, on the side of the ring structure facing the direction from which the inner section 171 approaches the ring structure.

The guide surface 167 is formed of low-friction material and is of perforated construction so that a lubricating fluid can bleed through the guide surface and thereby lubricate the surface. This serves to reduce frictional resistance to movement of the assembled shroud 25 over the guide surface 167. The lubricating fluid may be of any suitable form, such as a mixture of soap and water. Delivery lines 237 are incorporated in the retaining arms 233 for delivery of lubricating fluid to the guide surface.

A lower seal (not shown) is provided between the outer periphery of the pipe string 17 and the inner periphery of the shroud 25 at a location adjacent the region of the head end section 241 at which the two longitudinal sections of flexible material 161, 162 are assembled to form the shroud 25. The lower seal can be a combination of inflatable and flexible seals which in turn can be used to pressure test the shroud and connector means 275 before release from the pipe string. The lower seal is fixed in relation to the pipe string 17 so as to advance and withdraw with the pipe string and sealingly engage the outer section 173.

Figure 44:
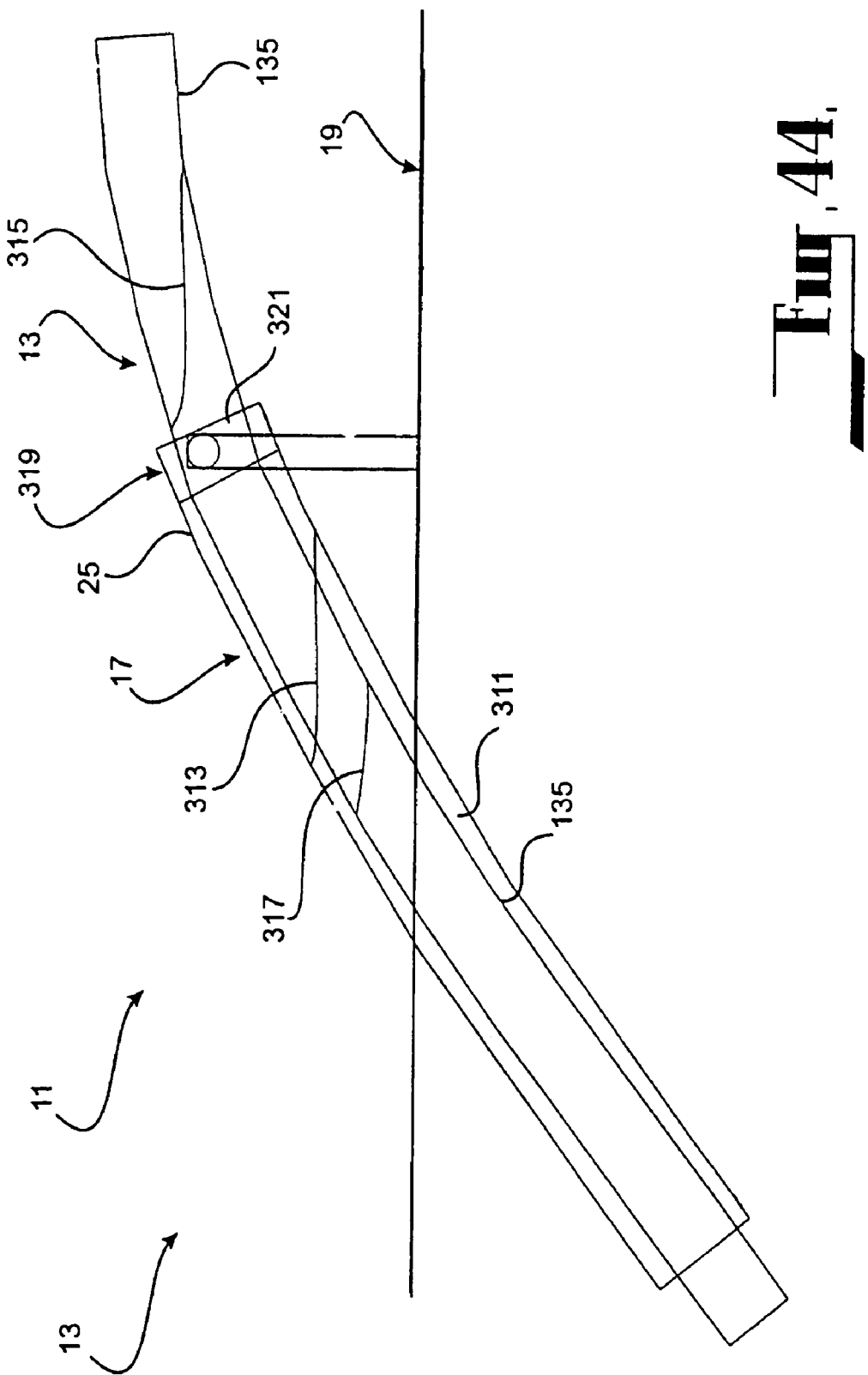
FIG. 44 illustrates the end section of the pipe string remote from the recovery head.

A sealed zone is defined within the shroud 25 above the lower seal to provide an inflation chamber 311 within the shroud. An inflation fluid, which in this embodiment is water, is introduced into the inflation chamber 311 for the purposes of inflating or pressurising the shroud 25 and urging it into supporting engagement against the periphery of the access passage 23 around the pipe string 17. In this way, the shroud 25 provides support for the surrounding material adjacent the periphery of the passage 23 for the purposes of preventing collapsing of the passage around the pipe string. The water level in the inflation chamber 211 is illustrated in FIG. 44 of the drawings and is identified by reference numeral 313.

The sealing ring 170 in combination with the guide surface 167, and the longitudinal sections of flexible material 161, 162 therebetween establish a seal to inhibit egress of inflation fluid from the chamber 311.

Some inflation fluid will of course escape with passage of the shroud 25 through the deployment slot 216, but such losses will not adversely affect operation of the apparatus, and in any event replenishment inflation fluid can be delivered to the inflation chamber 311 as necessary.

Water is also used to inflate the central compartment 137 and the two lateral compartments 139 within the enclosure 135. The water level in the two lateral compartments 139 is also illustrated in FIG. 44 of the drawings and is identified by reference numeral 315. From FIG. 44, it is evident that level 315 in the lateral compartments 139 is higher than level 313 within the chamber 311 to ensure that the lateral compartments remain expanded and are not crushed by the water pressure in the inflation chamber 311.

The water level in the central compartment 137 accommodating the conduits 133 in the pipe string 17 is illustrated in FIG. 44 and identified by reference numeral 217. The level 317 is lower than levels 313 and 315 so that the central compartment 137 is under negative pressure which assists in confining the conduits 133.

At station 13 at ground level 19, the end of the pipe string 17 is progressively assembled and is supported on support structure 319. The support structure 319 includes a collar 321 to which the adjacent end of the shroud 25 is clamped.

The shroud 25 is progressively deployed from the casing 164 as the passage 23 is formed by the recovery head advancing through the underground environment. The shroud 25 is continuously deployed as the pipe string 17 advances, with the longitudinal sections 161, 162 of flexible material being drawn along the lateral compartments 139 of the enclosure 135 on the pipe string, and then being turned about themselves on the guide means 165 and subsequently brought together to form the shroud in the manner described. With this arrangement, the shroud 25 is progressively deployed at the head end section 163, the outer section 173 of the shroud 131 being stationary with respect to the axis passage 23 once it has been deployed to form the shroud.

At the completion of a pass in the mining operation, the pipe string 17 and the recovery head 15 can be retracted along the passage 23. During retraction of the pipe string 17 and the recovery head 15, the shroud 25 is deflated and the two longitudinal sections of flexible material 161, 162 are also retracted and return to the rolls on which they are stored. During the retraction process, the connecting elements 177, 179 are unzipped with respect to each other and the longitudinal sections 161, 162 are drawn into and along the respective lateral compartments 139.

Figure 9:
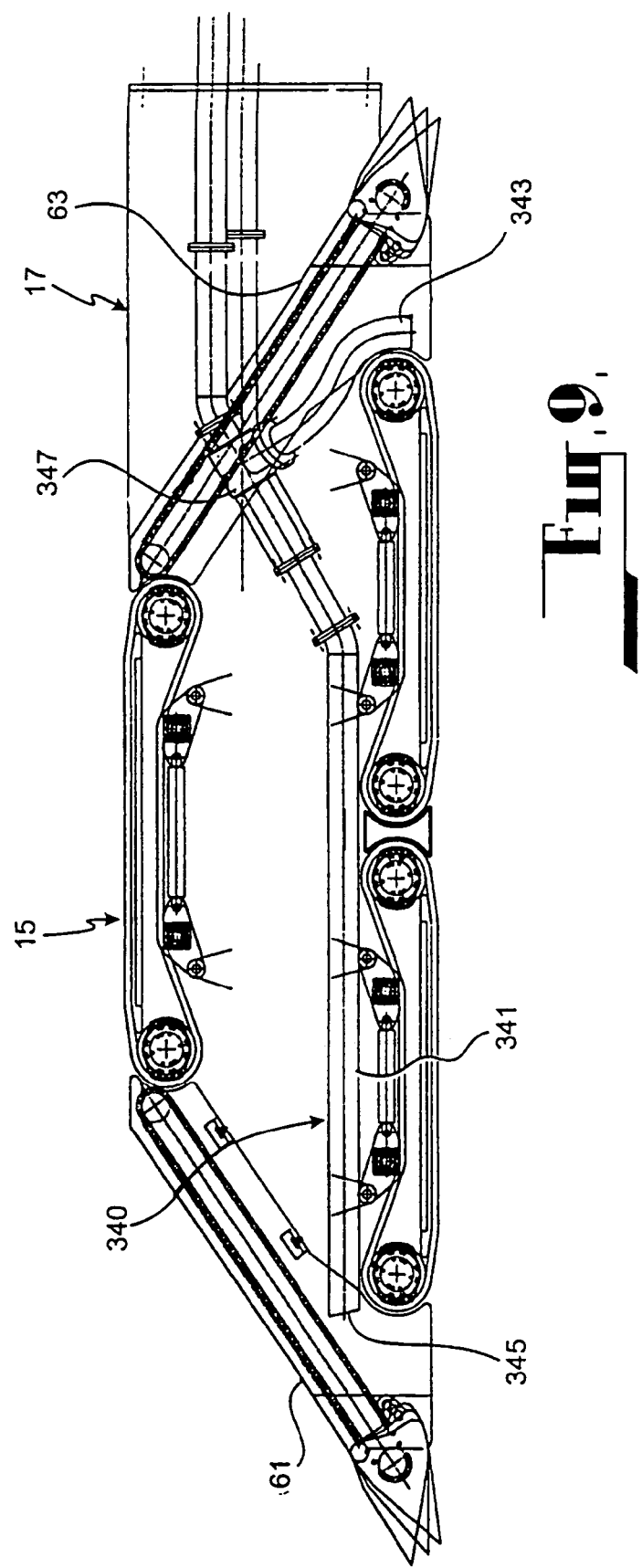
FIG. 9 is a further side view of the recovery head showing a transfer system therein.
Figure 10:
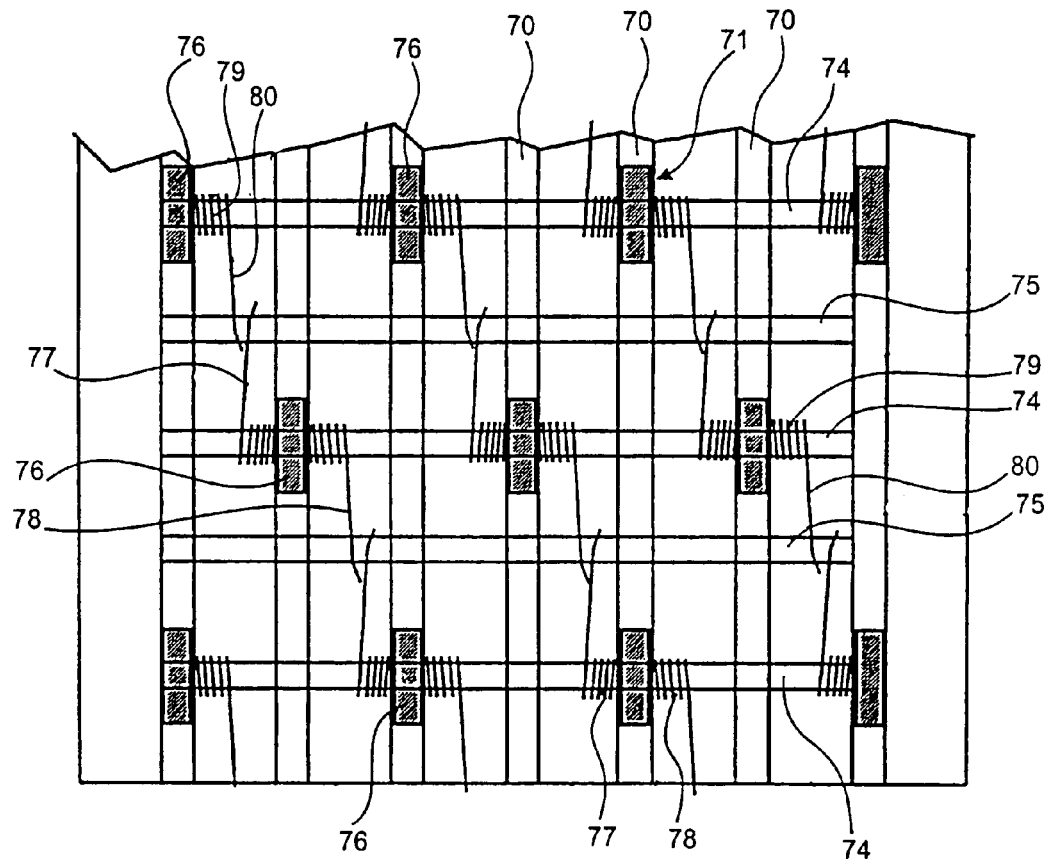
FIG. 10 is a fragmentary plan view of a tine assembly forming part of the recovery head.
Figure 11:
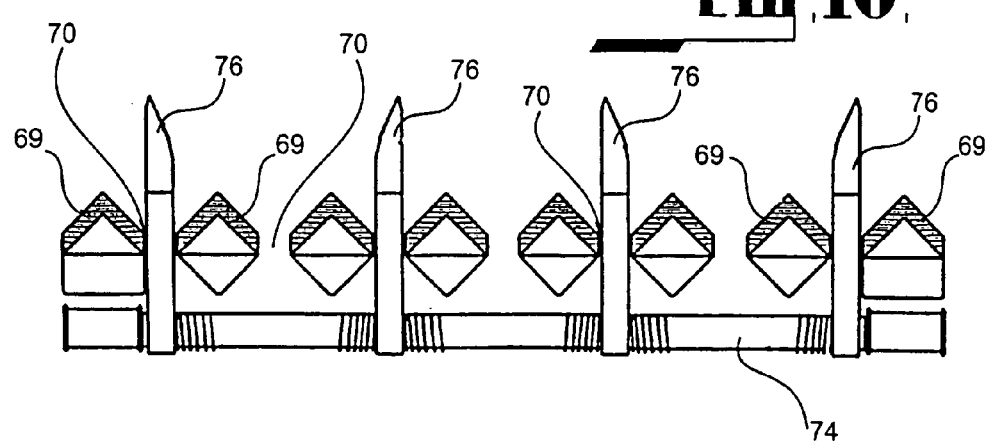
FIG. 11 is a cross-sectional view of the tine assembly of FIG. 10.
Figure 19:
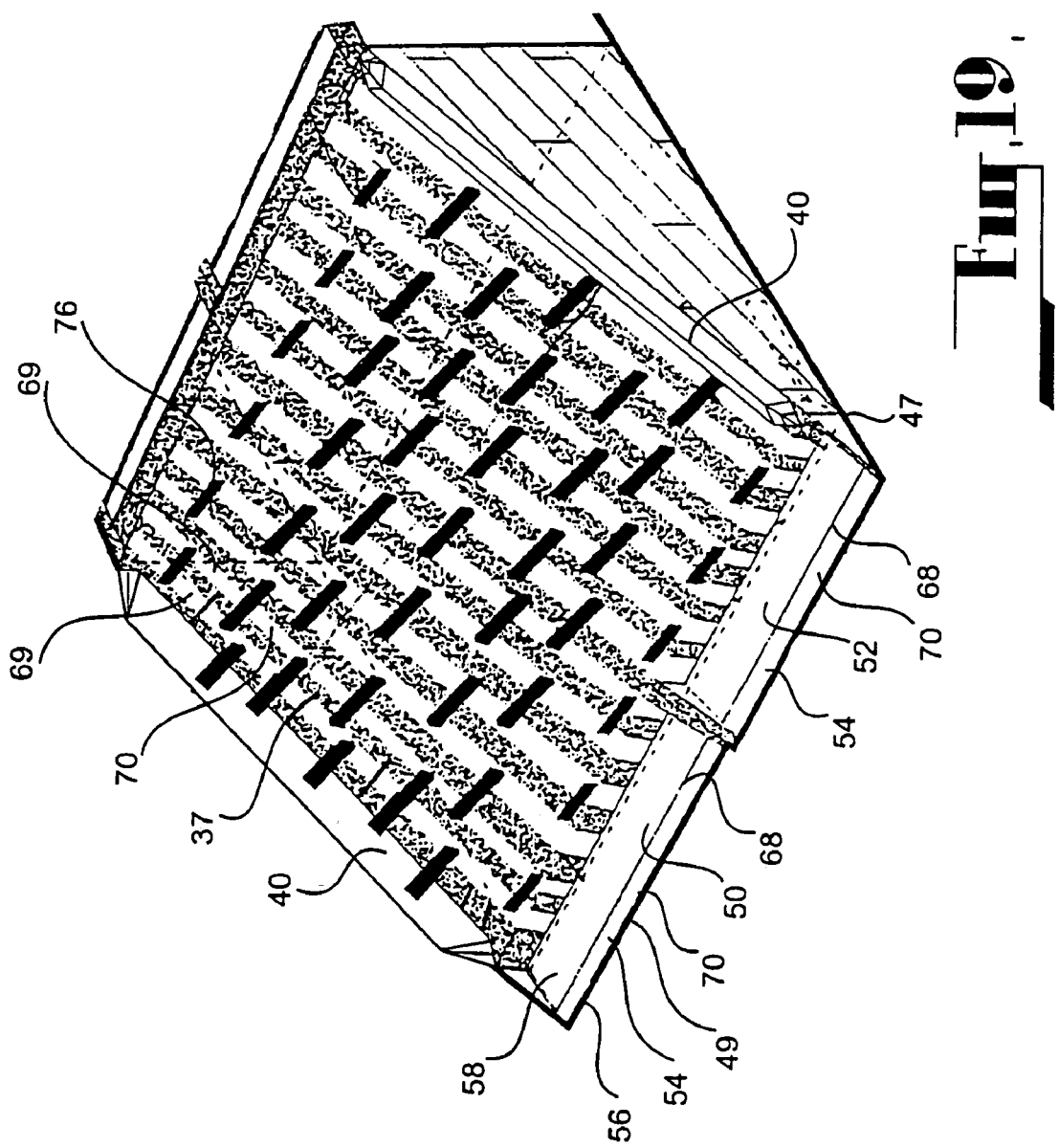
FIG. 19 is a fragmentary view of the front end of the recovery head showing the front screen and tines projecting therethrough.
Figure 20:
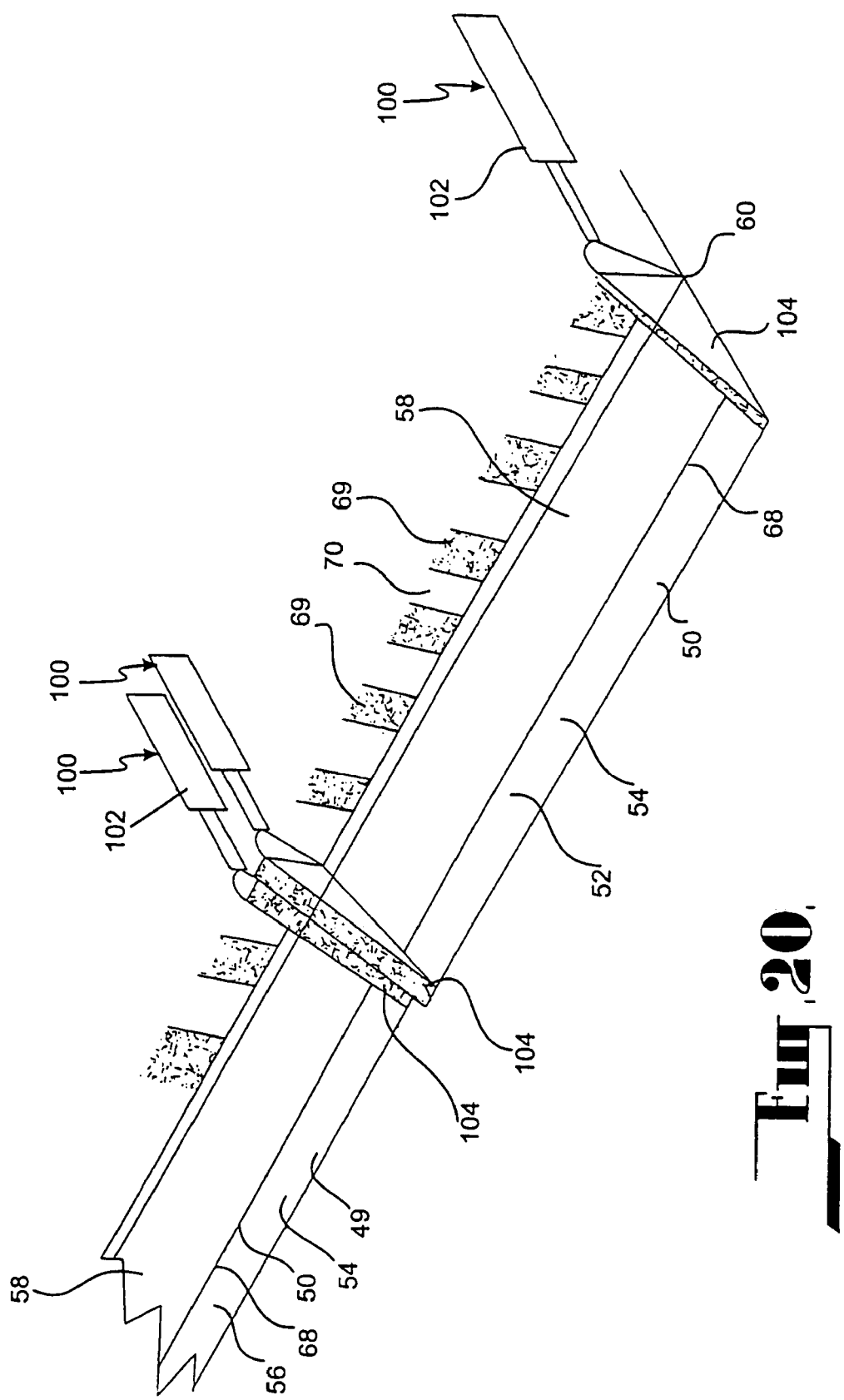
FIG. 20 is a fragmentary view of control flaps provided at the leading edge of the front screen.
Figure 21:
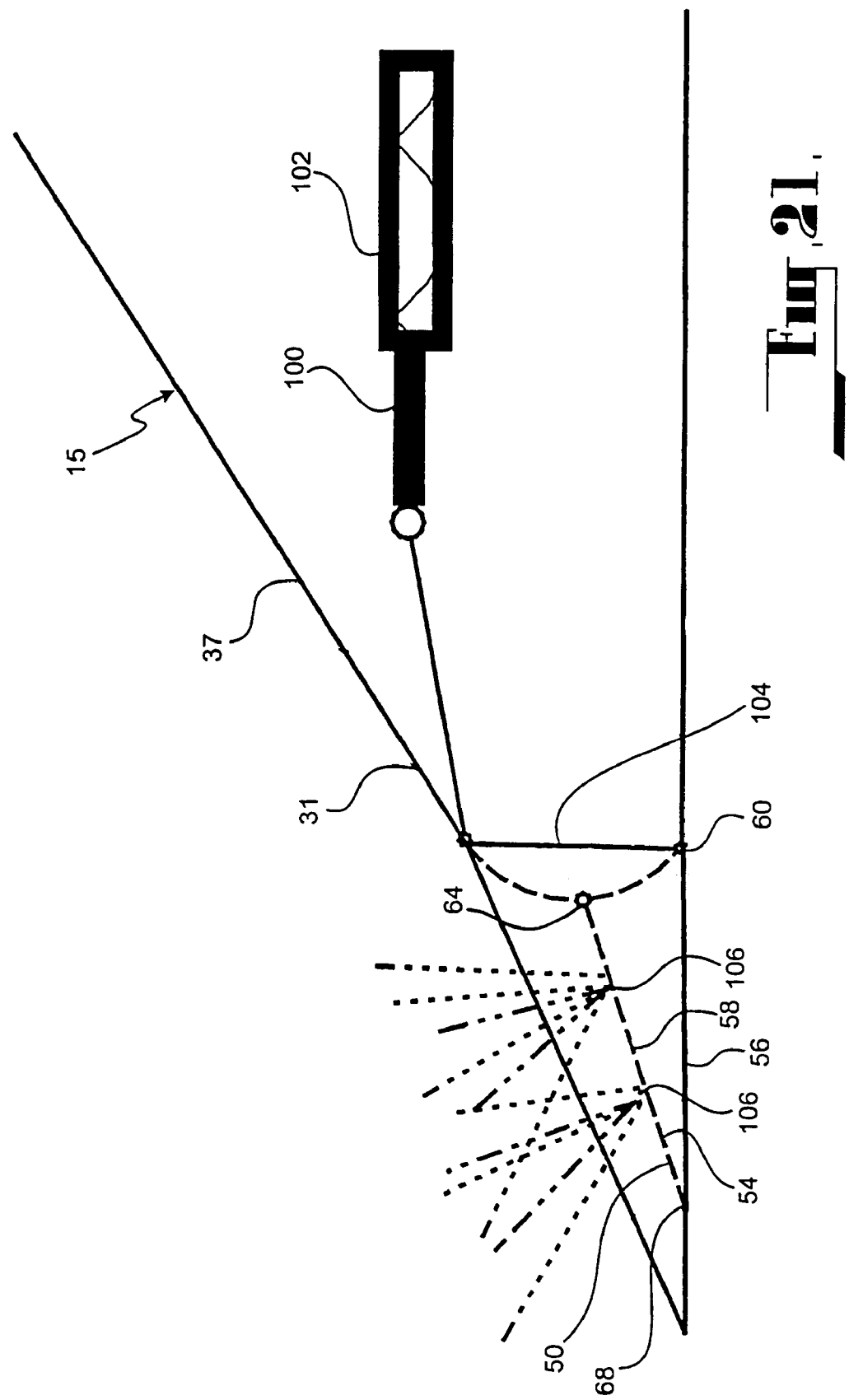
FIG. 21 is a schematic side view of one of the control flaps shown in one position.

In circumstances where the recovery head 15 is required to move in the reverse direction, the direction of rotation of the endless tracks 83, 85 and 86 is reversed so as to propel the recovery head in the required direction through the material which was previously deposited behind the recovery head when it was advancing forwardly. Because such material is in a disturbed condition, progress therethrough is unlikely to be difficult. To assist in such reverse movement of the recovery head 15 through the deposited material, the recovery head may be provided with a transfer means 340 (as shown in FIG. 9) for transferring the deposited material from the rear end thereof to the front end thereof as it moves in the rearward direction. The transfer means 340 comprises a transfer duct 341 through which the material can pass, the transfer duct 341 having an intake 343 adjacent the rear screen 63 and a discharge 345 adjacent the front screen 61 such that material is directed towards, and through, the front screen. The transfer means incorporates a jet pump 347 for transferring the material from the intake 343 to the discharge 345.

The shroud 25 is retracted during the reverse movement of the recovery head 15. This requires that the area adjacent the opening 166 at the rear end 168 of the casing 164 be free of compacted material which might otherwise obstruct the return movement of the shroud. This can be a particular problem in a sand environment where sand can be trapped behind the recovery head and with a build-up of pressure assume a compacted condition which locks the shroud against return movement. This problem is alleviated by inducing a flow of the sand from the region adjacent the rear end 168 of the casing 164 to the rear screen 63 in the recovery head. Such a flow is achieved by use of a series of water jets 271 along the casing 164 to establish a slurry of sand and induce that slurry to flow along a flow path (depicted by boundary lines 273) towards the rear screen 63, as shown in FIG. 47.

A cleaning operation is performed on the shroud as it is dismantled and during return of the longitudinal sections 161, 162 into the respective lateral compartments 139.

The cleaning operation may employ system 350 further includes inner water jets (not shown) for cleaning the inside surface of the retracting shroud 25.

Figure 46:
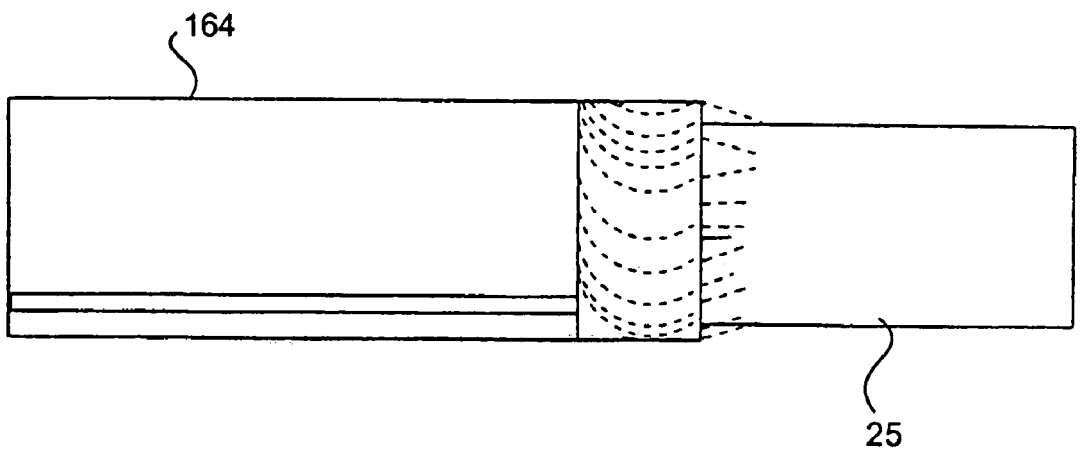
FIG. 46 is a schematic view of a cleaning system for cleaning the inner surface of the shroud during retraction thereof.

While the water jets for cleaning the inside and outside surfaces of the shroud 25 may utilise a linear spray pattern, it is advantageous for the spray pattern to be non-linear as an enhanced cleaning action is achieved. To this end, water jets on the outside of the casing 164 may develop an oscillating spray pattern, and water jets located on the inside of the casing 164 may induce a rotating body of water against the shroud surface, as depicted in FIG. 46 of the drawings.

A typical arrangement employing the underground mining apparatus 11 is illustrated in FIGS. 48 and 49. In this arrangement, recovered material is pumped along slurry delivery line 140 from the recovery head 15 to a processing plant 142 at station 13 on ground level. Typically, the recovered slurry comprises about 30% to 40% concentrate (by weight). After processing of the recovered material, tailings can be deposited at storage dump 144 and subsequently returned along return line 146 to a discharge outlet 148. Typically, the returned tailings in slurry form is 80% to 90% concentrate by weight. The delivery line 140 and the return line 146 each comprise a respective one of the conduits 33 incorporated in the pipe string 17.

During forward movement of the recovery head 15 as illustrated in FIG. 48, the returned slurry is discharged through the discharge outlet 148 which is rearwardly directed so as to discharge the returned slurry behind the forwardly moving recovery head 15. The returned slurry is pumped through the rear screen 63 and deposited around the shroud 25. In this way, the returned slurry can assist in supporting the roof of the access passage 23.

During reverse movement of the recovery head as illustrated in FIG. 49, the discharge direction of the discharge outlet 148 is reversed so that returned slurry is discharged through the front screen 61 to support the roof of the access passage 23 being vacated by the recovery head 15 and to bury the tailings, as previously described. Additionally, material entering through the rear screen 63 is transferred and discharged through the front screen 61.

Figure 50:
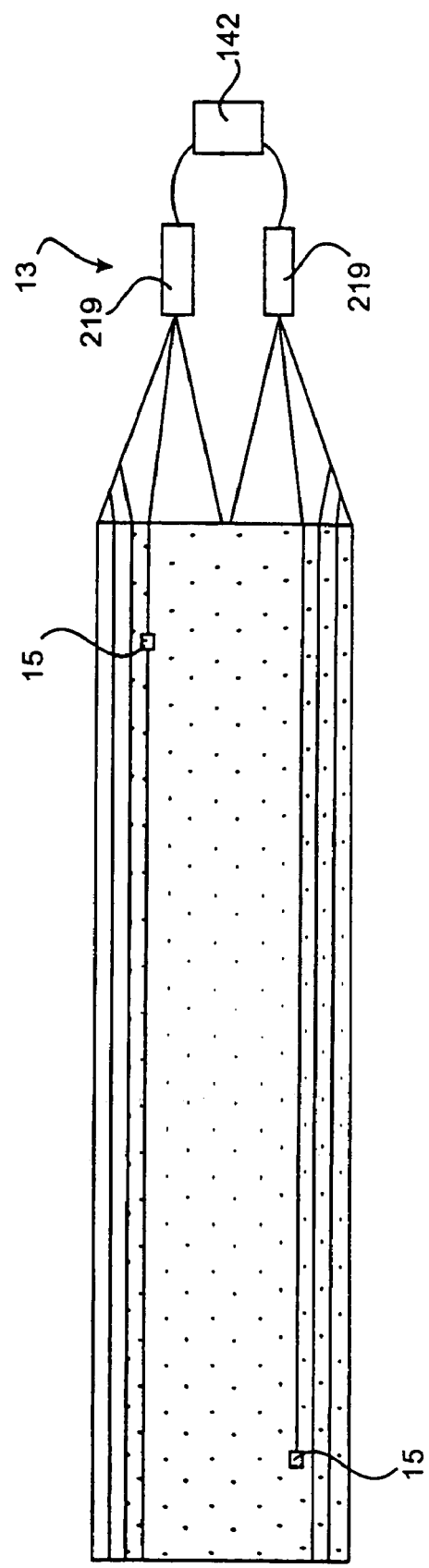
FIG. 50 is a schematic view illustrating a mining site at which two recovery heads are operating in tandem.

FIG. 50 illustrates a typical mining operation in which two apparatus 11 are being used to mine a deposit 360. The two recovery heads 15 operate in tandem but in reverse directions. The two apparatus 11 share a common processing plant 361. Because the two recovery heads 15 operate in tandem but in reverse directions, one advances in a forward direction to perform a mining operation in which recovered material is delivered along its delivery line 363 to the processing plant 361, while the other recovery head 15 retreats in a rearward direction returning material from the storage dump 365 to the access passage 23 which it is vacating.

The two recovery heads 15 perform overlapping multiple passes within the deposit 360 in order to mine the deposit. In the embodiment described, the pipe string 17 including casing 164 did not occupy the entire height of the rear screen 63 and so tines 76a are required in the region of the rear screen above the pipe string.

Figure 51:
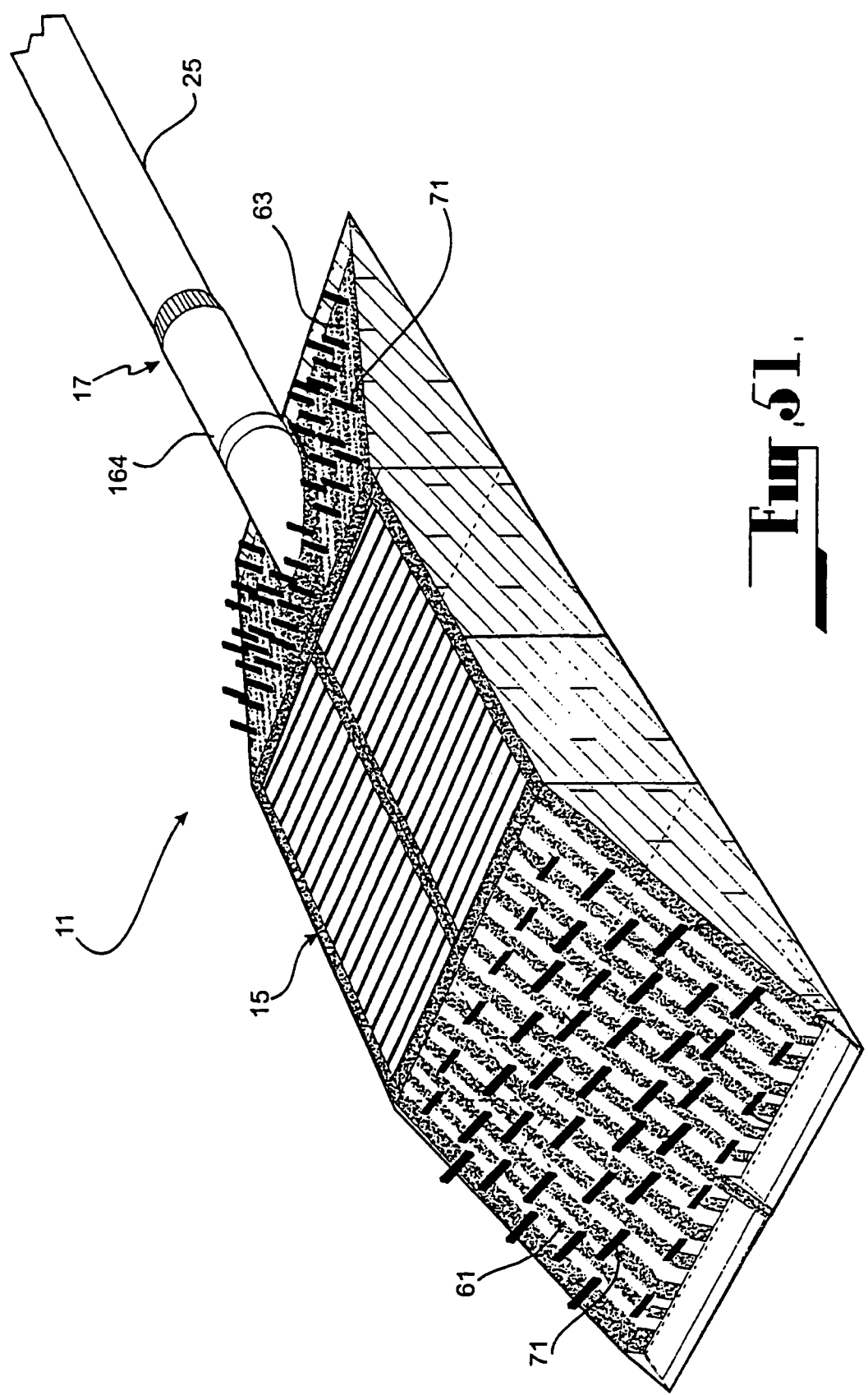
FIG. 51 is a perspective view illustrating an alternative arrangement of the pipe string in relation to the recovery head.
Figure 52:
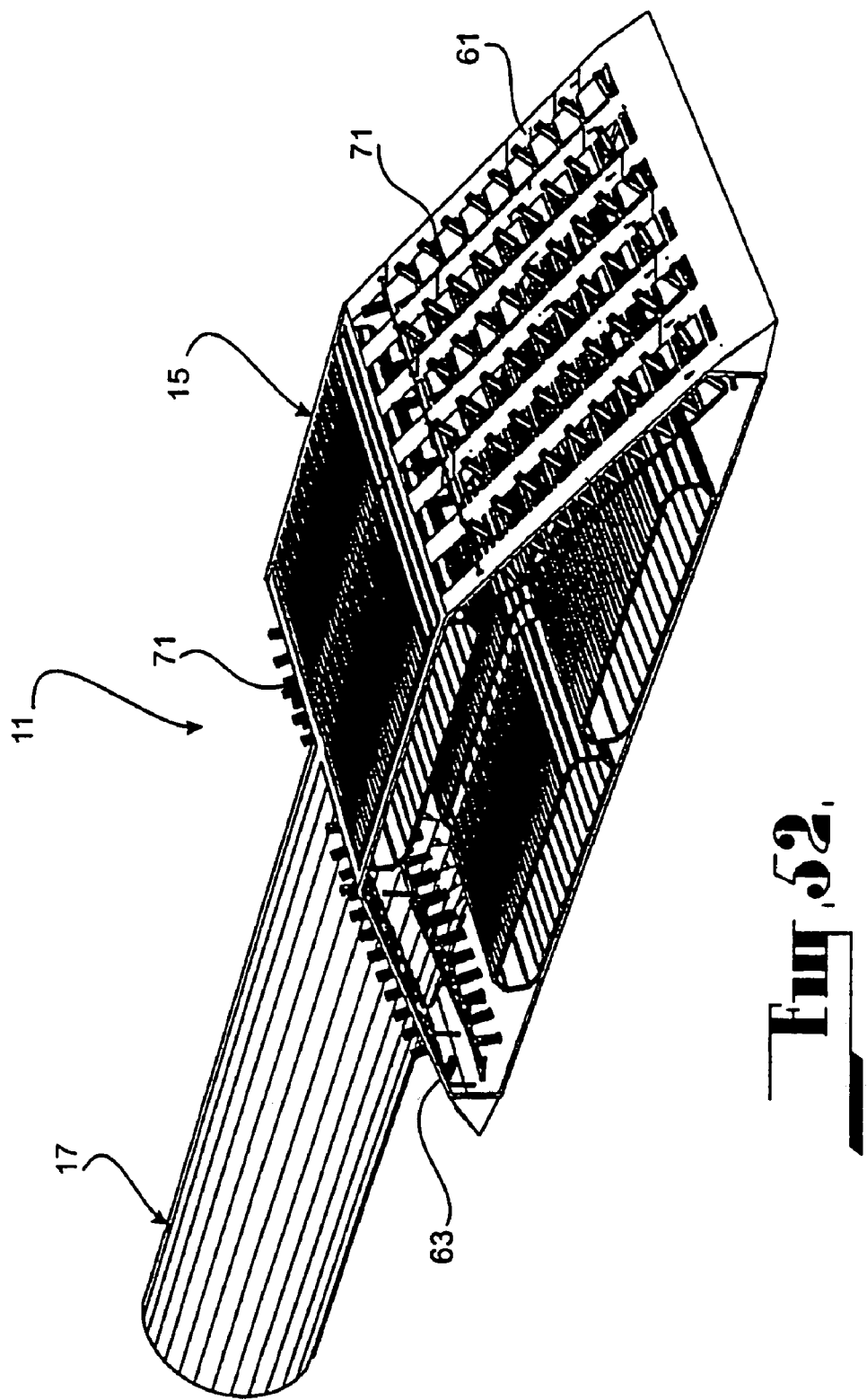
FIG. 52 is a further schematic view of the arrangement illustrated in FIG. 42.
Figure 53:
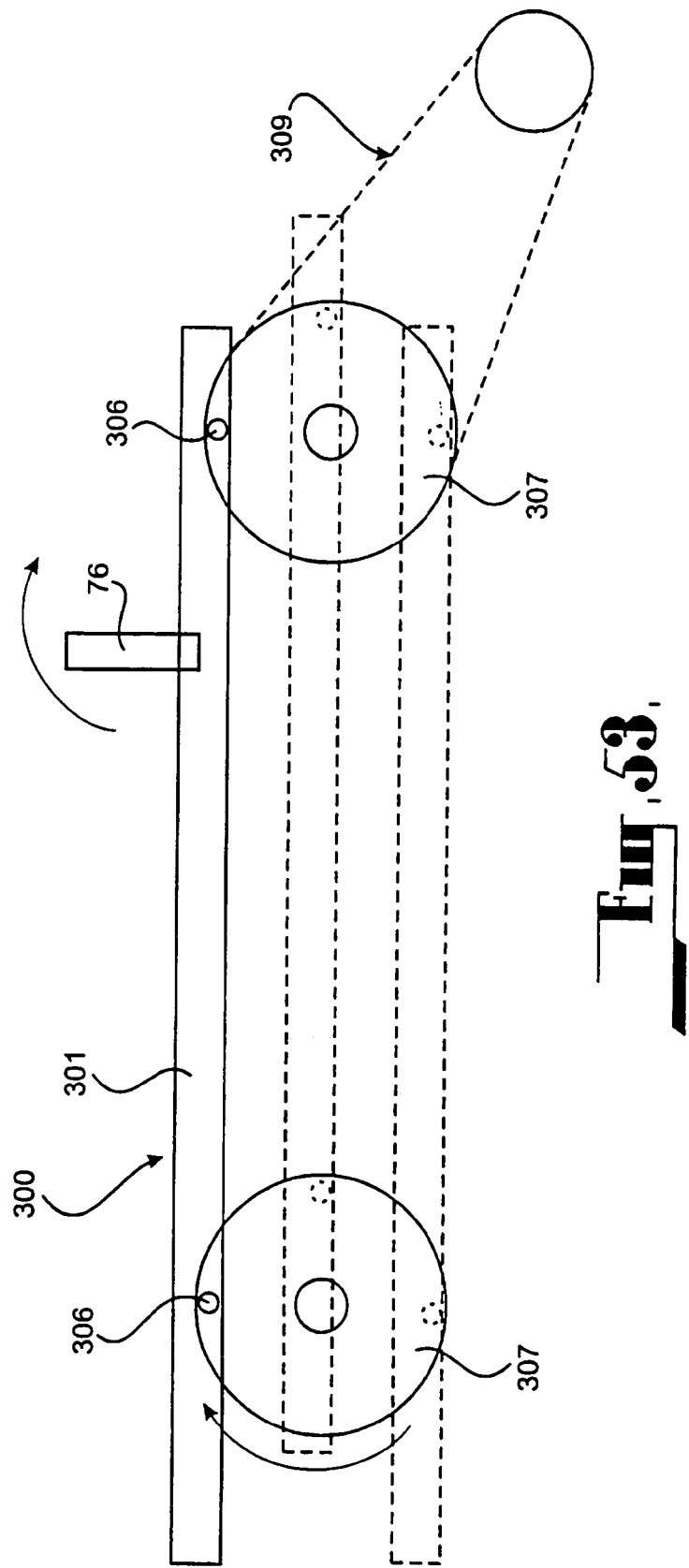
FIG. 53 illustrates an alternative arrangement for the tine assemblies.
Figure 54:
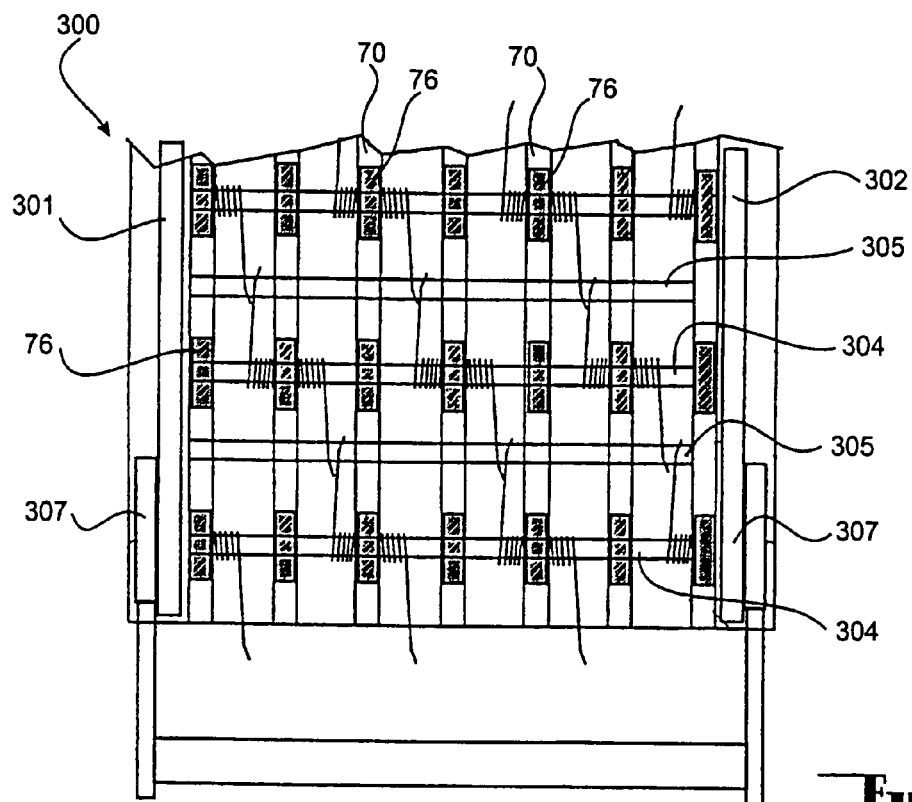
FIG. 54 is a fragmentary plan view of the arrangement illustrated in FIG. 53.
Figure 55:
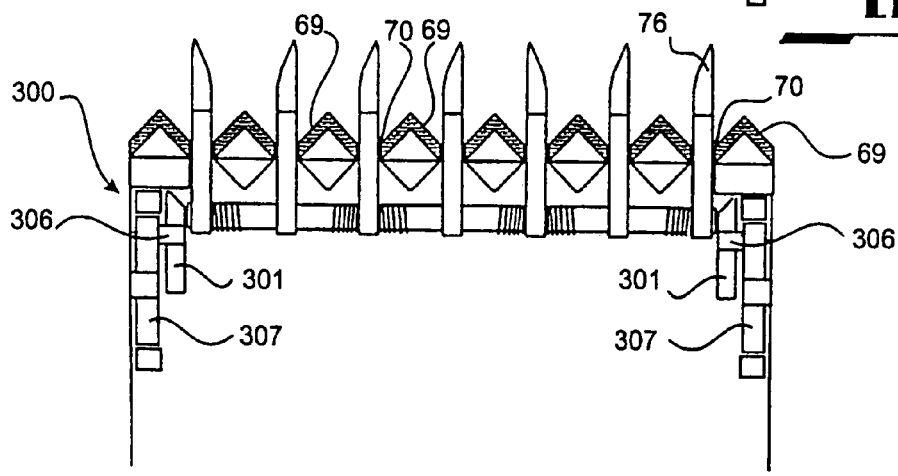
FIG. 55 is a cross-sectional view of the arrangement illustrated in FIG. 53.

In an alternative embodiment as illustrated in FIGS. 51 and 52, the pipe string 17 including casing 164 is of a larger diameter so as to occupy the entire height of the rear screen 63. With this arrangement, tines 76 are not required on the rear screen 63 above the pipe string.

Figure 45:
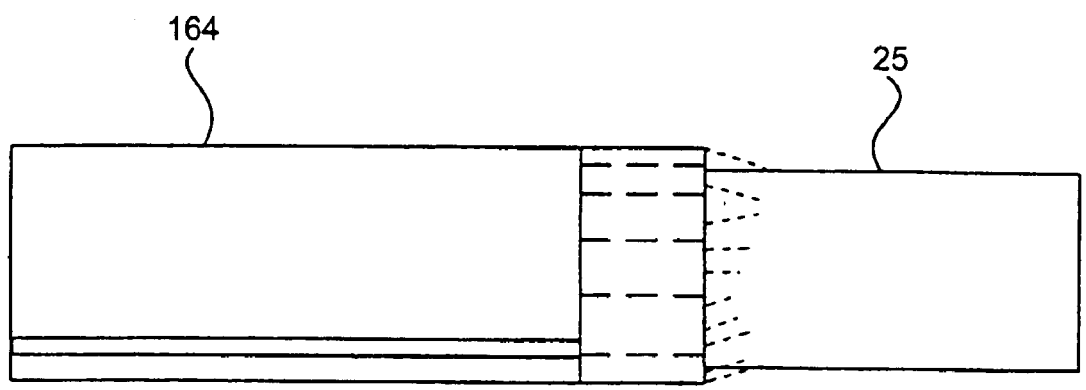
FIG. 45 is a schematic view illustrating a cleaning system for cleaning the outer surface of the shroud during retraction thereof.

In the embodiment described, the tines 76 in tine assemblies 71 move through a cyclical path determined by the path followed by the endless chain drive 72. In an alternative arrangement as illustrated in FIGS. 44, 45 and 46, a walking beam structure 370 is employed to move the tines 76 through a cyclical path. The walking beam structure 370 comprises two beams 371, 372 positioned in spaced apart, side-by-side relationship. First and second flights 374, 375 are supported between the beams 371, 372. The first and second flights 374, 375 are similar to the first and second flights 74, 75 in the embodiment described previously and support the tines 76 in a similar fashion. The two beams 371, 372 are each mounted at pivot 376 on two eccentrics 377, one of which is driven by drive system 379. With this arrangement, the tines 76 are caused to undergo movement through a cyclical path upon rotation of the eccentrics 377 by the drive system. The cyclical path takes each tine 76 along part of the length of the screen opening 70 with which it is associated. However, unlike the arrangement in the embodiment described previously where each tine 76 travelled almost the full length of the screen opening 76 with which it was associated, each tine 76 in this arrangement travels only part way along its respective screen opening. This therefore requires that stones and boulders moving over the screen be passed from tine to tine along the length of the screen.

In the embodiment described, the retracting shroud 25 simply enters the casing 164 in a straight fashion. In an alternative arrangement the retracting shroud 25 may expand to a size larger than the casing 164 by a mandrel (not shown). The mandrel (not shown) is located inside the retracting shroud 25 to stretch the flexible material which forms the shroud prior to its entry into the casing 164.

In the embodiments which have been described, the recovery head 15 has included a front screen 61 and a rear screen 63. In certain applications, it may not be necessary for there to be a rear screen.

Figure 56:
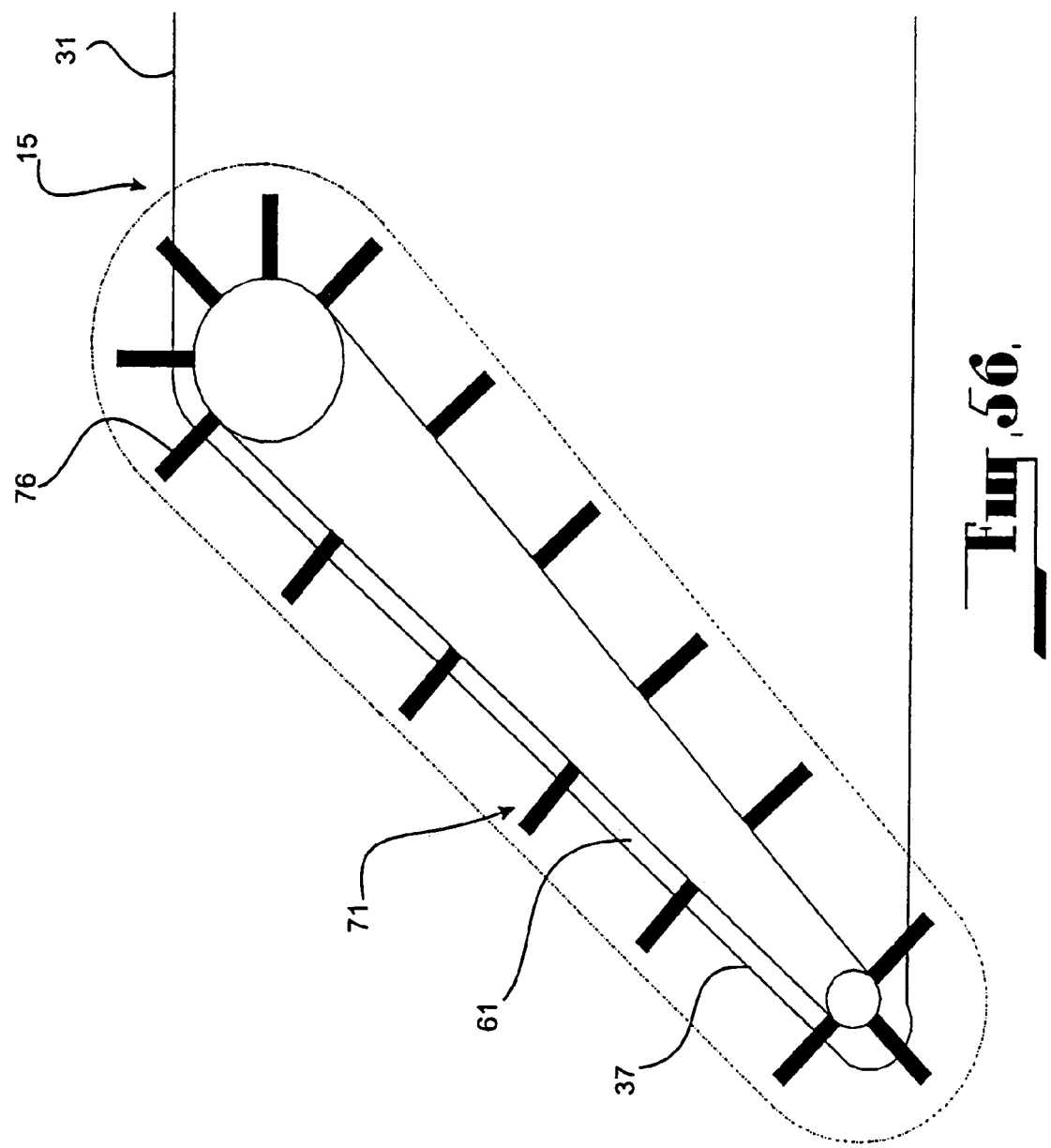
FIG. 56 is a fragmentary schematic view of a recovery head utilised in apparatus according to a further embodiment.

In the recovery head 15 described in relation to the first embodiment, the tine assembly 71 was limited in relation to the extent of its travel to within the confines of the upper and lower limits of the respective screen 61, 63. In certain applications, it would be particularly advantageous for the path of the tines 76 within the tine assemblies 71 to extend beyond the upper and lower limits of the respective screens so as to disturb material immediately above and below the body 31 as it progressively advances. The embodiment shown in FIG. 56 of the drawings illustrates such an arrangement. In this embodiment, the screen 61 with which the tine assembly 71 is associated has screening gaps which are open at the ends thereof such that the tines can travel beyond the screen and attack material above and below the body 31.

Figure 57:
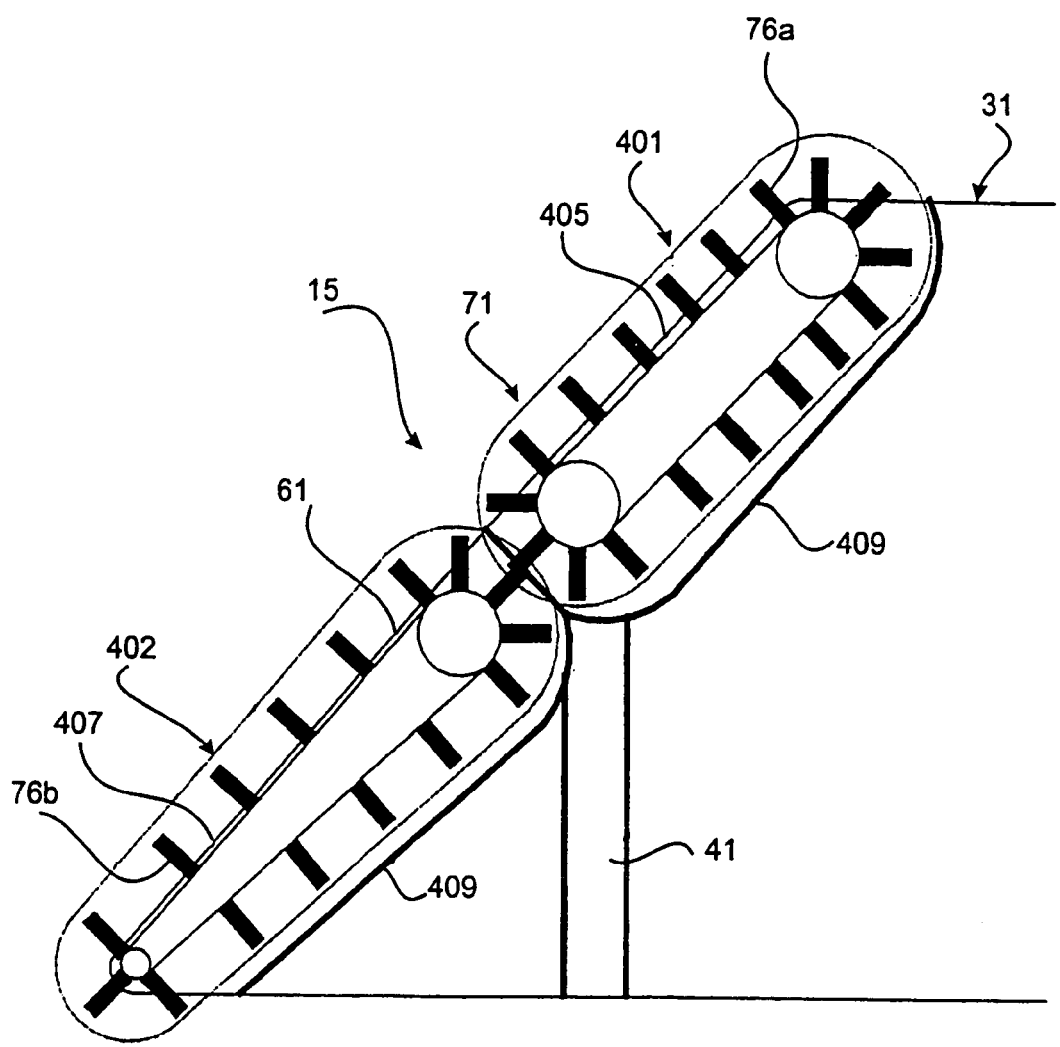
FIG. 57 is a schematic view of the forward section of the recovery head of apparatus according to a still further embodiment.

The embodiment shown in FIG. 57 of the drawings is similar to the previous embodiment in the sense that the path of the tines 71 extends beyond the upper and lower limits of the respective screen 61, 63. In this embodiment, however, the tine assembly 71 is formed in two sections, one being an upper tine assembly 401 and the other being a lower tine assembly 403.

The front screen 61 is also formed in two sections, one being an upper screen section 405 associated with the upper tine assembly 401 and the other being a lower screen section 407 associated with the lower tine assembly 403. The upper and lower screen sections 405, 407 are each in the form of a grizzly comprising a plurality of longitudinal elements positioned in spaced apart side-by-side relationship to define screening gaps therebetween. The screening gaps in the upper screen section 405 are offset with respect to the screening gaps 407 in the lower screen section 407. Accordingly, the tines 76a in the upper tine assembly 403 follow a path which is offset with respect to the tines in the lower tine assembly 403.

With this offsetting arrangement, the tine assemblies 401, 403 can overlap with respect to each other at their adjacent ends without conflict between the tines thereof.

This arrangement also allows the two screen sections 405, 407 to be supported at their adjacent inner ends. Because of such an arrangement, the screen sections 405, 407 can be of less robust construction than the screen section of the previous embodiment where central support is not possible. As shown in FIG. 57, a slurry tray 409 is associated with each screen section. Each slurry tray 409 is adapted to capture slurry material passing through the respective screen section such that the slurry material can be extracted and conveyed to the pipe string 17 for delivery to ground surface. The adjacent ends of the slurry trays are supported by a support 411 of any appropriate form.

It will be noted that the endless path followed by the lower ti assembly 403 has a radius of curvature at the lower end thereof narrower than the radius of curvature of its upper end. This is to allow the lower tine assembly to be positioned in the confined space available at the leading edge of the body 71.

It should also be appreciated that various modifications and changes can be made to the various aspects as described in the embodiment without departing from their inventive concepts.

For example the pipe string 17 incorporating shroud 25 may be used with any other form of recovery head such as a recovery head somewhat similar to that described with the exception that one or more of the endless tracks 83, 85 and 86 are replaced with Archimedean screws for propulsion.

Additionally, in the embodiments described, the longitudinal sections are arranged to be joined one to another prior to contact with the guide surface. In other embodiments, the longitudinal sections may be joined after contact with the guide surface.

Throughout the specification, unless the context requires otherwise, the word "comprise" or variations such as "comprises" or "comprising", will be understood to imply the inclusion of a stated integer or group of integers but not the exclusion of any other integer or group of integers.

I claim:

1. A recovery head comprising:
   a chamber for receiving material to be recovered;
   a screen associated with the chamber for screening material entering the chamber;
   propulsion means for propelling the recovery head through a formation containing the material to be recovered, said propulsion means including an endless track having a first run which is exposed to the exterior of the recovery head for driving engagement with the environment through which the recovery head is to pass and a second run within the confines of the recovery head so as not to be exposed to that environment;
   a seal positioned between the first run and a wall of the recovery head for inhibiting the ingress of unwanted material into the interior of the recovery head; and
   water jets positioned adjacent the seal such that water under pressure can issue from the water jets and clean the seal.

2. A recovery head as claimed in claim 1 wherein the seal has two opposed edges, one of which is mounted on the wall with a hinge and the other of which is adapted for sealing contact with the first run.

3. A recovery head as claimed in claim 1 wherein the endless track has an outer facing including a plurality of elements for penetrating material in the environment through which the recovery head passes, and the seal is adapted to sealingly contact the outer face.

4. A recovery head as claimed in claim 1 wherein the seal is biased into engagement with the first run.

5. A recovery head as claimed in claim 4 wherein the seal is configured to interact with oncoming material in the environment through which the recovery head passes, whereby such interaction biases the seal into sealing engagement with the first run.

6. A recovery head as claimed in claim 1 wherein the seal is disposed at a location inwardly of the outer face of the first run of endless track.

7. A recovery head as claimed in claim 1 wherein the first run is configured for moving in a forward direction and a reverse direction such that the recovery head can move forwardly and then be retracted.

8. A recovery head as claimed in claim 7 including a transfer means for transferring material deposited at the rear of the recovery head to the front of the recovery head, as the recovery head is retracted and moved in the reverse direction.

9. A recovery head according to claim 1 including a suction system positioned in the interior of the recovery head for extracting any sand or other debris that enters into the interior of the recovery head.

10. A recovery head as claimed in claim 1 in combination with a pipe string for transferring material recovered by the recovery head to a remote station.

11. A recovery head according to claim 1 further comprising a casing in which the chamber is accommodated, the casing having an interior through which the second run passes, the casing also having two openings through which the endless belt passes between the interior of the casing and the exterior of the recovery head, and means associated with the openings for inhibiting ingress of unwanted material into the casing interior.

12. A recovery head according to claim 11 wherein said means associated with the opening comprise sealing means at each opening.

13. A recovery head as claimed in claim 1 including water jets positioned adjacent the seal such that water under pressure can issue from the water jets and clean the seal.

14. A recovery head as claimed in claim 1 including a support structure for supporting the first run against inward deflection thereof under loading applied by the surrounding environment.

15. recovery head according to claim 1 wherein the screen has a first side from material being screened passes therethrough and a second side, a plurality of elongate screen openings in the screen extending between the first and second sides thereof, a plurality of tines mounted on support means disposed on the second side of the screen, each tine being moveable along a path at least part of which includes one of the elongate screen openings whereby the tine is receivable in and moveable along the elongate screen opening, the tine extending beyond the first side of the screen for at least part of the movement thereof along the screen opening.

16. A recovery head according to claim 15 wherein the support means is adapted to move each tine through a cyclical path.

17. A recovery head according to claim 16 wherein the cyclical path takes the tines through at least part of the chamber for disturbing material received therein.

18. A recovery head according to claim 15 wherein the tine support means comprises a plurality of flights extending transversely of said path, each flight carrying a plurality of tines spaced along the length thereof at intervals corresponding to the spacing between the screen openings occupied by the tines, each tine being rigidly mounted on its respective flight, and two springs associated with each tine, each spring having a coiled portion and an arm portion, the coiled portion being fitted on and attached to the flight, and the arm portion of one spring extending to and engaging one of two adjacent flights, the arm portion of the other spring extending to and engaging the other of the two adjacent flights, whereby the springs interact with the two adjacent flights to bias the flight carrying the tine to assume an orientation in which the tine occupies a normal position extending through its respective screen opening as it travels therealong.

* * * * *